United States Patent
Sato et al.

(10) Patent No.: US 7,266,220 B2
(45) Date of Patent: Sep. 4, 2007

(54) MONITORING DEVICE, MONITORING METHOD AND PROGRAM FOR MONITORING

(75) Inventors: Satoshi Sato, Osaka (JP); Masamichi Nakagawa, Osaka (JP); Kunio Nobori, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 827 days.

(21) Appl. No.: 10/427,486

(22) Filed: May 1, 2003

(65) Prior Publication Data

US 2003/0210807 A1 Nov. 13, 2003

(30) Foreign Application Priority Data

May 9, 2002 (JP) .............................. 2002-134583

(51) Int. Cl.
*G06K 9/00* (2006.01)

(52) U.S. Cl. .................... 382/104; 340/937; 348/113; 701/200; 701/301

(58) Field of Classification Search ................ 382/100, 382/103, 107, 104, 106; 340/933, 937; 348/113; 701/2, 41
See application file for complete search history.

(56) References Cited

U.S. PATENT DOCUMENTS

| | | | | |
|---|---|---|---|---|
| 5,499,784 A | * | 3/1996 | Crabere et al. | 244/135 A |
| 5,500,904 A | * | 3/1996 | Markandey et al. | 382/103 |
| 5,515,448 A | * | 5/1996 | Nishitani | 382/106 |
| 5,777,690 A | * | 7/1998 | Takeda et al. | 348/699 |
| 5,991,428 A | * | 11/1999 | Taniguchi | 382/107 |
| 6,250,448 B1 | * | 6/2001 | Salecker et al. | 192/103 F |
| 6,259,359 B1 | | 7/2001 | Fujinami et al. | |
| 6,445,809 B1 | * | 9/2002 | Sasaki et al. | 382/104 |
| 2001/0012982 A1 | * | 8/2001 | Ogura et al. | 701/301 |
| 2003/0007682 A1 | * | 1/2003 | Koshizen et al. | 382/157 |

FOREIGN PATENT DOCUMENTS

| | | |
|---|---|---|
| JP | 05233813 A | 9/1993 |
| JP | 06247246 A | 9/1994 |
| JP | 06282655 A | 10/1994 |
| JP | 07050769 A | 2/1995 |
| JP | 2000074645 A | 3/2000 |
| JP | 2000090243 A | 3/2000 |
| JP | 2000168442 A | 6/2000 |
| JP | 2000251199 A | 9/2000 |
| JP | 2001266160 A | 9/2001 |
| JP | 2002104113 A | 4/2002 |

* cited by examiner

*Primary Examiner*—Vikkram Bali
*Assistant Examiner*—Anand Bhatnagar
(74) *Attorney, Agent, or Firm*—Harness, Dickey & Pierce, P.L.C.

(57) ABSTRACT

In a monitoring device for vehicles, an optical flow detection section determines an optical flow from an image taken with a camera. A background flow estimation section determines a background flow, which is a flow for the camera image under the assumption that the image is a background, based on the motion of the vehicle. An approaching object detection section detects motion of an object in the surroundings of the vehicle by comparing the optical flow with the background flow.

16 Claims, 35 Drawing Sheets

FIG.9A time t
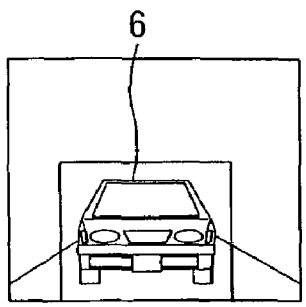
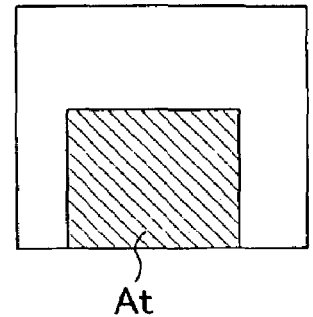
FIG.9B time t-1
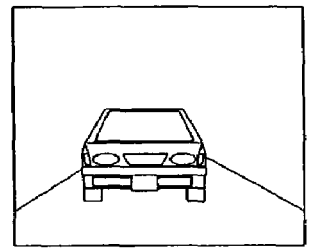
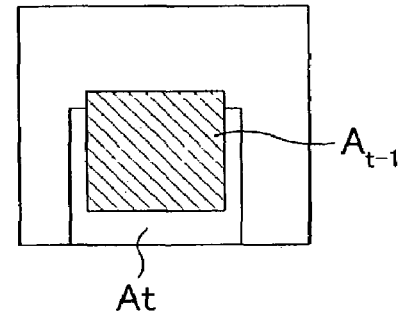
FIG.9C time t-2
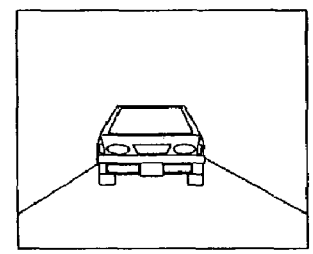
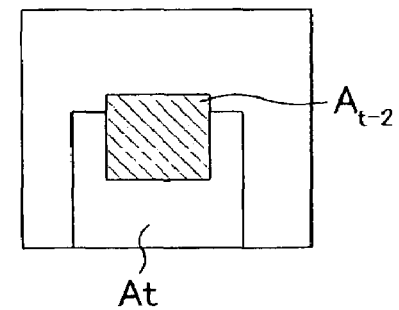
FIG.9D time t-N
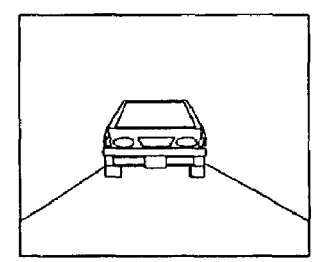
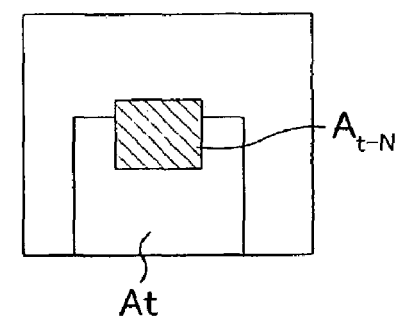

Region L Region R

Region L    Region R

AR1
AR2

Region L    Region R

AR1
AR2

MONITORING DEVICE, MONITORING METHOD AND PROGRAM FOR MONITORING

BACKGROUND OF THE INVENTION

The present invention relates to a monitoring technology for vehicles in which the situation around a vehicle is monitored with a camera for detection of an approaching object.

Conventionally, various approaches have been made for monitoring devices for vehicles for monitoring the situation around a vehicle for detection of an approaching object.

As one of such approaches, there is a technique using an obstacle sensor such as radar. This technique can provide reliable detection of an obstacle, but does not suit to complicate determination such as whether or not the obstacle is coming closer or going away. As other problems, the detection is greatly affected by rainfall and the like, and the detection range is comparatively narrow. For these reasons, it is conventionally difficult to detect an approaching object with an obstacle sensor alone.

A technique using a camera image is also under way. This technique fails to provide reliability as high as that provided by radar, but permits complicate determination such as whether or not an obstacle is coming closer or going away because processing of digitized image information is easy. In addition, a very broad range can be monitored because the detection range is determined by the angle of view and resolution of the camera.

As the technique using a camera image, a stereo method using a plurality of cameras and a method using optical flows are widely known. The stereo method, which uses the parallax between cameras, has problems that calibration between cameras is complicate and that the use of a plurality of cameras costs high.

A monitoring device for vehicles using optical flows is disclosed in Japanese Patent Gazette No. 3011566 (first related art), for example. In this monitoring device, a camera is placed to point to the rear from the vehicle. A screen has a plurality of horizontally-divided regions. In each of these regions, an optical flow is extracted, which has a magnitude equal to or larger than a predetermined threshold and has a direction identical to that of the motion of an approaching object on an image when such an approaching object is assumed. Based on the extracted optical flow, an approaching object is recognized.

For monitoring during curve running, some methods have already been proposed.

For example, in Japanese Laid-Open Patent Publication No. 2000-168442 (second related art), a turning vector is computed from the steering angle and travel speed of a vehicle, and the resultant turning vector is subtracted from an actually determined optical flow, to thereby correct the optical flow. After removal of influence of a curve by this correction, a moving object is extracted.

In Japanese Laid-Open Patent Publication No. 6-282655 (third related art), an optical flow is corrected based on the outputs of a car speed sensor and a yaw rate sensor and pre-measured correspondence between the image position and the distance, to remove influence of a curve. After this removal, a moving object is extracted.

A technique using a focus of expansion (FOE) on an image (see Japanese Laid-Open Patent Publication No. 7-50769, for example) has been widely employed for detection of an approaching object using an optical flow. In some proposals, this technique is applied to curve running.

For example, in Japanese Laid-Open Patent Publication No. 2000-251199 (fourth related art), an optical flow is corrected with an amount corresponding to a travel amount of a FOE.

In Japanese Laid-Open Patent Publication No. 2000-90243 (fifth related art), a screen is divided into a plurality of areas and a virtual FOE is determined for each area based on white-line information determined by a white-line determination means.

Japanese Patent Gazette No. 2882136 (sixth related art) discloses a technique of detecting an approaching object using an optical flow free from influence of a curve. In this technique, a difference $\epsilon i^2$ between a motion vector Vdi theoretically computed from a movement parameter of a camera and a motion vector Vi detected from an image is computed according to the following expression using vectors r1i and r2i representing the reliability of the motion vector detected from an image, to thereby detect a moving object from the computed difference value.

$$\epsilon i^2 = ((Vdi-Vi) \cdot r1i)^2 + ((Vdi-Vi) \cdot r2i)^2$$

The conventional techniques described above have the following problems.

The first related art assumes that a vehicle equipped with the monitoring device (user's vehicle) is running straight ahead. Therefore, use of this technique for curve running is difficult. That is, in this technique, an approaching object is detected by use of the "direction of the motion of an approaching object on an image when such an approaching object is assumed". This "direction of the motion" is not uniquely determined when the vehicle is running along a curve. This matter will be described with reference to FIGS. 34A and 34B.

Assuming that a camera points to the rear, an image as shown in FIG. 34A is taken when the vehicle is running along a curve. In the first related art, horizontally divided region L and region R are set as shown in FIG. 34A. Assuming that an approaching car exists in range AR1 in the region L as shown in FIG. 34B, the "direction of the motion of the assumed approaching car" is lower rightward as shown by the corresponding arrow in FIG. 34B. On the contrary, in range AR2, which also belongs to the range L but is different in vertical position from the range AR1, the "direction of the motion of an assumed approaching vehicle" is lower leftward as shown by the corresponding arrow in FIG. 34B, which is completely different from the direction of the motion in the range AR1. Thus, when the vehicle is running along a curve, the "direction of the motion of an assumed approaching vehicle" varies with the position of the approaching vehicle even in the same region L. This makes difficult the detection of an approaching vehicle.

Even during running of a vehicle along a straight road, the magnitude of an optical flow is significantly different between the upper and lower parts of a screen. More specifically, in the upper part of the screen, which shows a region distant from the user's vehicle, a detected optical flow is very small. On the contrary, in the lower part of the screen, which shows a region very close to the user's vehicle, a detected optical flow is relatively very large.

Therefore, if the upper and lower parts of the screen are subjected to processing with the same threshold, the accuracy of detection of an approaching vehicle is degraded with high possibility. For example, the threshold will be a very small value when determined based on the small flow in the upper part of the screen. If the lower part of the screen is subjected to processing with this threshold, noise tends to arise. On the contrary, the threshold will be a very large value when determined based on the large flow in the lower part of the screen. If the upper part of the screen is subjected to processing with this threshold, most optical flows will be below the threshold, resulting in failure of detection of an approaching object.

In the first related art, also, an approaching vehicle is detected using only optical flows having a magnitude equal to or more than a predetermined value. Therefore, a vehicle running alongside the user's vehicle at nearly an equal speed fails to be detected because the magnitude of the optical flow for this vehicle is nearly zero.

In the second related art, the turning vector generated by turning of the user's vehicle varies in magnitude and direction with the three-dimensional relative position from the camera of an object point related to the turning vector. Therefore, the turning vector can be estimated only when the correspondence between a point on the camera image and a point on the three-dimensional real world is known.

The above matter will be described with reference to FIG. 35. FIG. 35 shows the relationship between a camera image taken with a camera 2 and a three-dimensional coordinate system in the real world. The camera image has Xi axis in the horizontal direction and Yi axis in the vertical direction. The real world coordinate system has Xw, Yw and Zw axes defined as shown in FIG. 35. That is, it is assumed that plane Xw-Zw is a plane parallel to the road surface, direction Xw is rightward and leftward with respect to the user's vehicle, direction Yw is normal to the road surface, and direction Zw is forward and backward with respect to the vehicle. A camera coordinate system (Xc, Yc, Zc) is also set in which the focal point of the camera is the origin and the optical axis of the camera is Zc axis. Note that the directions of the axes are not limited to those specified above. These coordinate systems have relationships given by expression (1) representing perspective projection transformation and expression (2) representing coordinate transformation.

$$Xc = \frac{XiZc}{f}, Yc = -\frac{YiZc}{f} \quad (1)$$

$$\begin{pmatrix} Xw \\ Yw \\ Zw \\ 1 \end{pmatrix} = \begin{pmatrix} r_{11} & r_{12} & r_{13} & t_x \\ r_{21} & r_{22} & r_{23} & t_y \\ r_{31} & r_{32} & r_{33} & t_z \\ 0 & 0 & 0 & 1 \end{pmatrix} \begin{pmatrix} Xc \\ Yc \\ Zc \\ 1 \end{pmatrix} \quad (2)$$

where f is the focal distance of the camera and r is constants determined by internal parameters of the camera and by the position at which the camera is placed, that is, the position of the camera coordinate system in the real world coordinate system, which are known values. From the above relational expressions, it is found that a three-dimensional coordinate position in the real world corresponding to an arbitrary point on the camera image is on a straight line passing through the focal point of the camera. However, the position cannot be determined uniquely without further information provided.

To state differently, as shown in FIG. 36, a position in the real world coordinate system can be transformed to a point on the camera image by use of the perspective projection transformation (expression (1)) and the coordinate transformation (expression (2)). However, these relational expressions are not enough to realize the reverse transformation from a point on the camera image to a position in the real world coordinate system. In the second related art, the turning vector must be determined for respective points on the camera coordinate system. However, this transformation is impossible unless other conditions are additionally provided.

In the third related art, as in the second related art, no mention is made of how to determine the correspondence between the image position and the distance, and therefore implementation of this technique as it stands is impossible.

In the fourth related art, a FOE exists only during straight-ahead running, and no FOE exists during curve running in the first place. Therefore, if an optical flow is corrected using a FOE, a fairly large error will arise for running along a curve too sharp to approximate straight-ahead running. This is therefore unpractical.

The fifth related art is naturally unavailable when a vehicle runs on a road having no white line.

The sixth related art, which assumes that immobile objects are predominant on an image, has a problem that detection will be unsuccessful in such a case that a large moving object like a truck exists in the vicinity of the camera.

SUMMARY OF THE INVENTION

An object of the present invention is providing a monitoring device for vehicles for detecting an approaching object using an optical flow, in which an approaching object can be detected accurately even during curve running.

Specifically, the monitoring device of the present invention determines an optical flow from an image taken with a camera capturing the surroundings of a vehicle, determines a background flow, which is an optical flow for the image under the assumption that the image is a background, based on motion of the vehicle, and detects motion of an object existing in the surroundings of the vehicle by comparing the optical flow with the background flow.

According to the present invention, the background flow is an optical flow obtained when a camera image is assumed as a background. Therefore, by comparing the background flow with the optical flow actually determined from the camera image, the motion of an object existing in the surroundings of the vehicle can be detected accurately. In addition, since the detection is performed by comparing the background flow with the optical flow at each point on the image, an approaching object can be detected precisely even when the vehicle is running along a curve. Moreover, as for an object of which an optical flow determined from an image is small in magnitude, such as a vehicle running alongside the user's vehicle and a distant approaching object, the optical flow is greatly different from the background flow at the point on the image. Therefore, such an object can be easily detected.

The background flow is preferably determined using a space model modeling a space the camera is capturing. The space model preferably includes at least a road surface model modeling a road surface on which the vehicle is running. Otherwise, the space model preferably includes at least a wall model assuming a wall normal to the road surface.

Alternatively, the monitoring device of the present invention determines an optical flow from an image taken with a camera capturing the surroundings of a vehicle, determines a space flow, which is motion of a point on the image in a real world coordinate system, based on the optical flow, motion of the vehicle and a space model modeling a space the camera is capturing, and detects motion of an object existing in the surroundings of the vehicle.

BRIEF DESCRIPTION OF THE DRAWINGS

FIGS. 9A to 9D are conceptual views demonstrating processing by the noise reduction section.

DESCRIPTION OF THE PREFERRED EMBODIMENTS

Hereinafter, preferred embodiments of the present invention will be described with reference to the accompanying drawings.

EMBODIMENT 1

Figure 37:
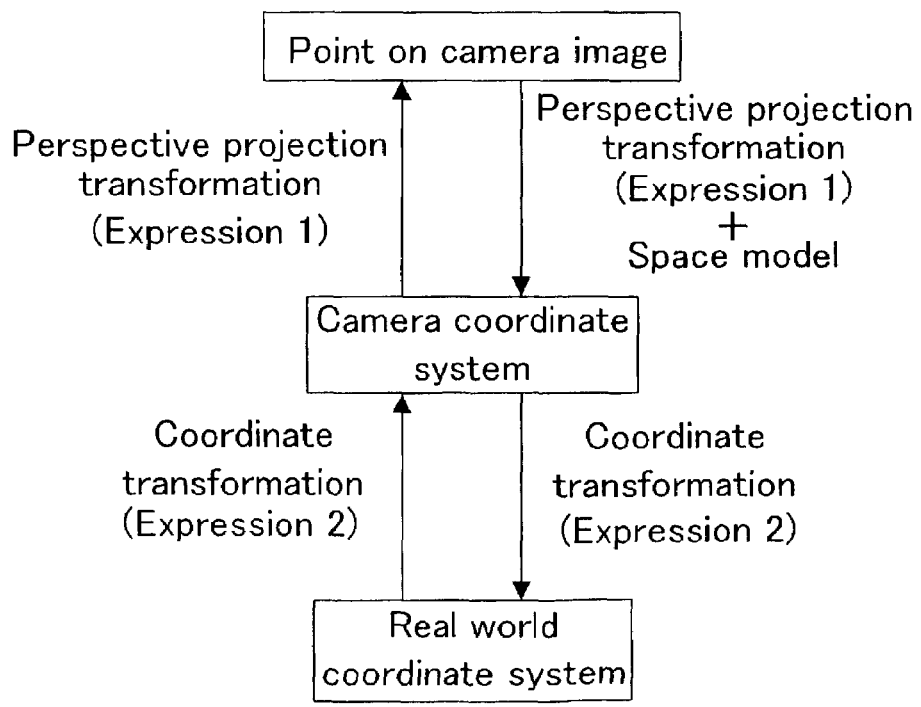
FIG. 37 is a view showing the relationship between a camera image and a real world coordinate system according to the present invention.

In Embodiment 1 of the present invention, the surroundings of a vehicle are monitored in the following manner. First, optical flows are determined using images from a camera capturing the surroundings of the vehicle. Secondly, the correspondence between respective points on a camera image and three-dimensional coordinates in the real world is estimated as a "space model". As shown in FIG. 37, by use of this space model together with the perspective projection transformation, a point on the camera image can be precisely associated with real world three-dimensional coordinates. Thereafter, using the space model and estimated user's vehicle motion information, optical flows under the assumption that points on the image constitute a background, not a moving object, are computed. The thus-computed optical flows are called "background flows". The background flows are compared with the optical flows actually determined from the image, to thereby detect an approaching object.

That is, the background flows are computed considering precisely the correspondence between points on the camera image and real world three-dimensional coordinates. Therefore, in this embodiment, the motion of an object in the surroundings of the vehicle can be detected accurately, compared with the prior art. In addition, even during curve running, an approaching object can be detected precisely because the detection is made by comparison between a background flow and an optical flow at each point on the image. As for a vehicle running alongside the user's vehicle and a distant approaching object, although the optical flow determined from images is small in magnitude, it is still greatly different from the background flow at the same point. Therefore, in this embodiment, such an object can also be easily detected.

Figure 1:
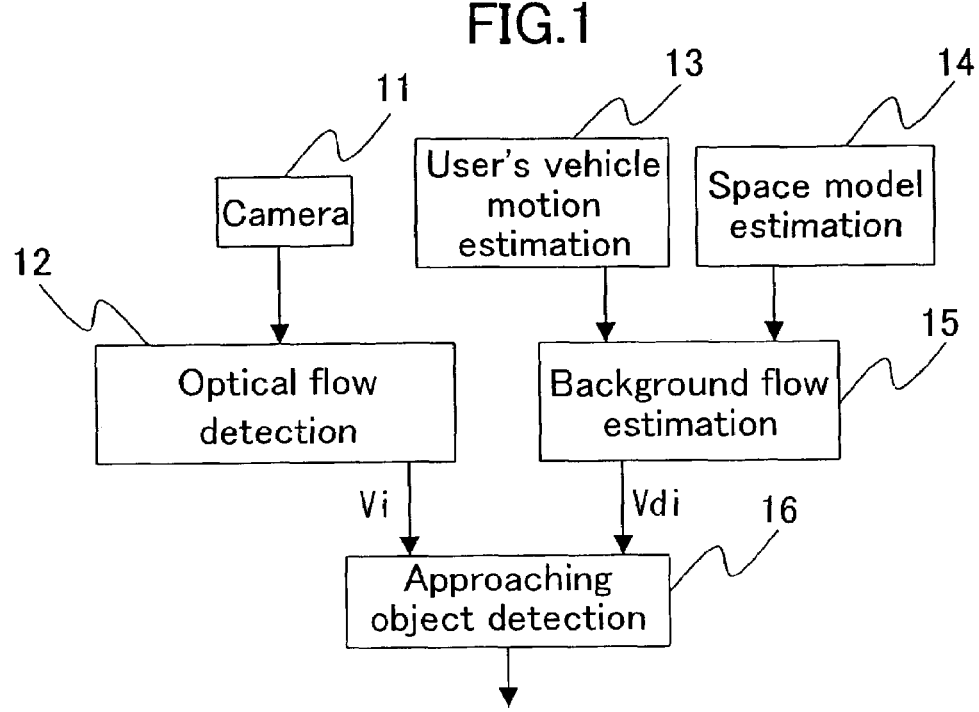
FIG. 1 is a block diagram of a monitoring device of Embodiment 1 of the present invention.

FIG. 1 is a block diagram conceptually showing the basic configuration of a monitoring device for vehicles of this embodiment. The monitoring device of this embodiment detects the motion of an object existing in the surroundings of a vehicle with a camera 11 capturing the surroundings of the vehicle. More specifically, as shown in FIG. 1 as the basic configuration, the monitoring device of this embodiment includes: an optical flow detection section 12 for computing an optical flow Vi from images taken with the camera 11; a user's vehicle motion detection section 13 for detecting the motion of the vehicle; a space model estimation section 14 for estimating a model of a space the camera 11 is capturing; a background flow estimation section 15 for estimating a background flow Vdi based on the motion of the user's vehicle and the space model; and an approaching object detection section 16 for detecting an approaching object by comparing the optical flow Vi with the background flow Vdi.

The camera 11 is typically mounted on the user's vehicle for sensing the situation around the user's vehicle. Alternatively, a camera placed in an infrastructure such a road, a signal and a building, and a camera mounted on a neighboring vehicle may be used, in combination with the camera mounted on the user's vehicle or by itself. The use of such a camera is effective in situations in which an approaching vehicle is hardly visible from the user's vehicle, such as at a crossroad with poor visibility.

<Optical Flow Detection>

The optical flow detection section 12 detects an "optical flow", indicating an apparent motion vector on an image from two images taken with the camera 11 at different times. For detection of an optical flow, two methods are widely known. One is a gradient method in which a constraint equation for space-time differentials of an image is used, and the other is a block matching method using template matching (Minoru Asada, "Understanding of Dynamic Scene", The Institute of Electronics, Information and Communication Engineers). In this embodiment, the block matching method is employed.

The block matching method, which generally involves total search, requires a huge amount of processing time. Therefore, for reduction of the processing time, a technique of arranging images hierarchically is widely employed (Gang Xu and Saburo Tsuji, "Three-Dimensional Vision", Kyoritsu Shuppan). To state specifically, hierarchical images are produced by scaling down a given image to a half, one-fourth, one-eighth, . . . in both length and width. With these hierarchical images, two points that are distant from each other in an image with high resolution (large size) are close to each other in an image with low resolution (small size). In consideration of this, template matching is first performed for images with low resolution. Thereafter, next template matching for images with higher resolution is performed only in the neighborhood of an optical flow obtained from the first template matching. By repeating this processing, an optical flow can be finally determined for original images with high resolution. Since this method involves only local research, the processing time can be greatly reduced.

<Estimation of Motion of User's Vehicle>

The user's vehicle motion estimation section 13 determines the rotational speed of the left and right wheels and the steering angle of the steering wheel of the user's vehicle, to thereby estimate the motion of the user's vehicle. This estimation method will be described with reference to FIGS. 2 and 3. Note that herein a so-called Ackerman model (two-wheel model) in which the state having no sideway sliding of tires is approximated is used.

Figure 2:
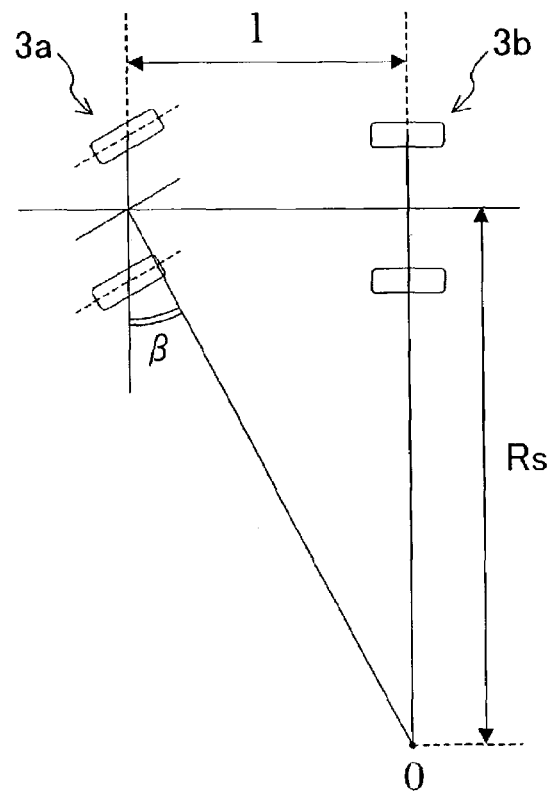
FIG. 2 is a view demonstrating how to estimate the motion of the user's vehicle, or a conceptual view demonstrating an Ackerman model.

FIG. 2 is a view showing an Ackerman's steering model. Assuming that no sideway sliding of tires occurs, the vehicle turns around point o existing on an extension of the axis of rear wheels 3b when the steering wheel is turned. The turning radius Rs at the center between the rear wheels 3b is represented by expression (3) using a turning angle β of the front wheels 3a and the wheel base 1.

$$Rs = \frac{1}{\tan\beta} \qquad (3)$$

Figure 3:
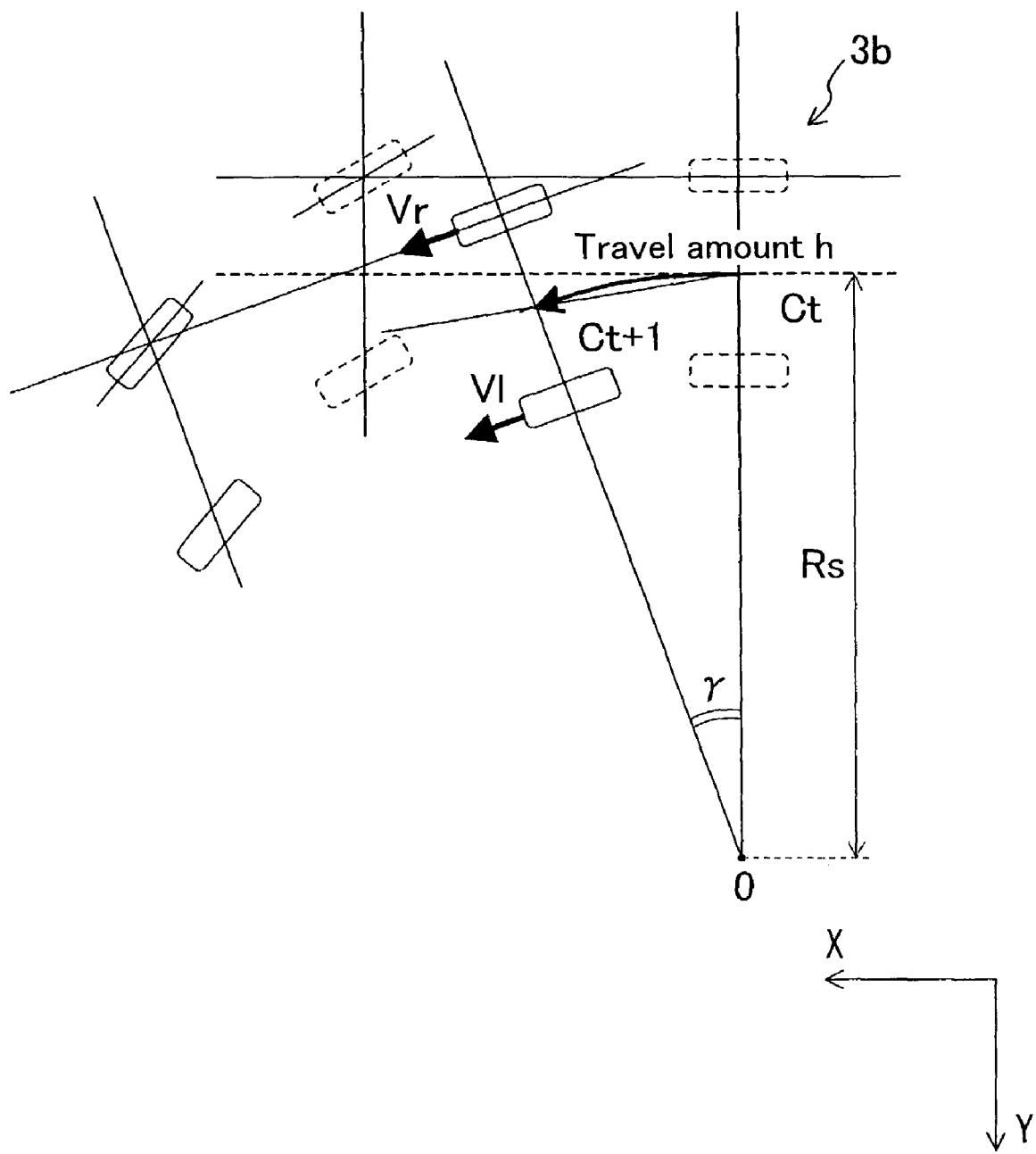
FIG. 3 is a view demonstrating how to estimate the motion of the user's vehicle, or a conceptual view illustrating the motion of the vehicle on a two-dimensional plane.

FIG. 3 shows the motion of a vehicle on a two-dimensional plane. As shown in FIG. 3, when the center between the rear wheels 3b moves from Ct to Ct+1, the travel amount h is represented by expression (4) using the left and right wheel speeds Vl and Vr, or the turning radius Rs at the center between the rear wheels 3b and the travel turning angle γ.

$$h = \int \frac{Vl + Vr}{2} dt = Rs * \gamma \qquad (4)$$

From expressions (3) and (4), the travel turning angle γ is represented by expression (5).

$$\gamma = \frac{1}{Rs} \int \frac{Vl + Vr}{2} dt = \frac{\tan\beta}{1} \int \frac{Vl + Vr}{2} dt \qquad (5)$$

Accordingly, the turning amount α of the vehicle with respect to the plane is represented by expression (6).

$$\alpha = \gamma = \frac{\tan\beta}{1} \int \frac{Vl + Vr}{2} dt \qquad (6)$$

The motion vector T from Ct to Ct+1 is represented by expression (7) when X axis is the vehicle travel direction and Y axis is the direction vertical to the vehicle travel direction.

$$T = (Rs\sin\gamma, Rs(1 - \cos\gamma)) = \frac{1}{\tan\beta}(\sin\gamma, 1 - \cos\gamma) \qquad (7)$$

From expressions (6) and (7), the motion of the vehicle can be estimated if the left and right wheel speeds Vl and Vr and the steering angle β are known.

Naturally, the motion of the vehicle may also be determined directly with a car speed sensor and a yaw rate sensor, not only with the wheel speed and the steering angle information. Otherwise, GPS and map information may be used to determine the motion of the vehicle.

<Space Model Estimation>

The space model estimation section 14 estimates a space model modeling the space the camera is capturing. The space model is used for determining the correspondence between a point on a camera image and real world three-dimensional coordinates, as described above. That is, from expressions (1) and (2), an arbitrary point on a camera image can be associated with a straight line in the real world space passing through the focal point of the camera. The intersection point between the straight line in the real world space and the estimated space model is then determined, and in this way, the arbitrary point on the camera image can be projected in the real world three-dimensional coordinate system.

Assume herein that the space model is prepared based on distance data for objects the camera is capturing. The distance data can be measured by use of binocular vision or a motion stereo method, for example, or by use of an obstacle sensor using laser, ultrasonic, infrared, millimeter wave or the like if such an obstacle sensor is mounted on the vehicle.

In the case of using a camera secured to an infrastructure such as a building, three-dimensional information on the space the camera is capturing is known because buildings and the like being captured by the camera very rarely change in shape. In this case, therefore, estimation of a space model is unnecessary, and a known space model may be determined in advance for each camera.

In the case of using a camera mounted on a vehicle, GPS and the like may be used to precisely locate the position of the vehicle. By locating the current position of the vehicle on detailed map information, a space model can be estimated. For example, if it is found that the vehicle is running inside a tunnel from GPS and map data, a space model can be prepared from shape information on the tunnel such as its height and length. Such shape information may be included in the map data in advance, or may be held on the side of the infrastructure such as the tunnel to be given to the vehicle via communication. For example, shape information of a tunnel may be transmitted to a vehicle that is about to enter the tunnel by a communication means such as DSRC provided at the entrance of the tunnel or the like. This method can be applied, not only to tunnels, but also to roads, expressways, residential districts, parking lots and the like.

<Background Flow Estimation>

The background flow estimation section 15 detects a motion on an image (optical flow) when it is assumed that points corresponding to a space model are immobile, that is, the points constitute a background, not a moving object, as a background flow.

Figure 4:
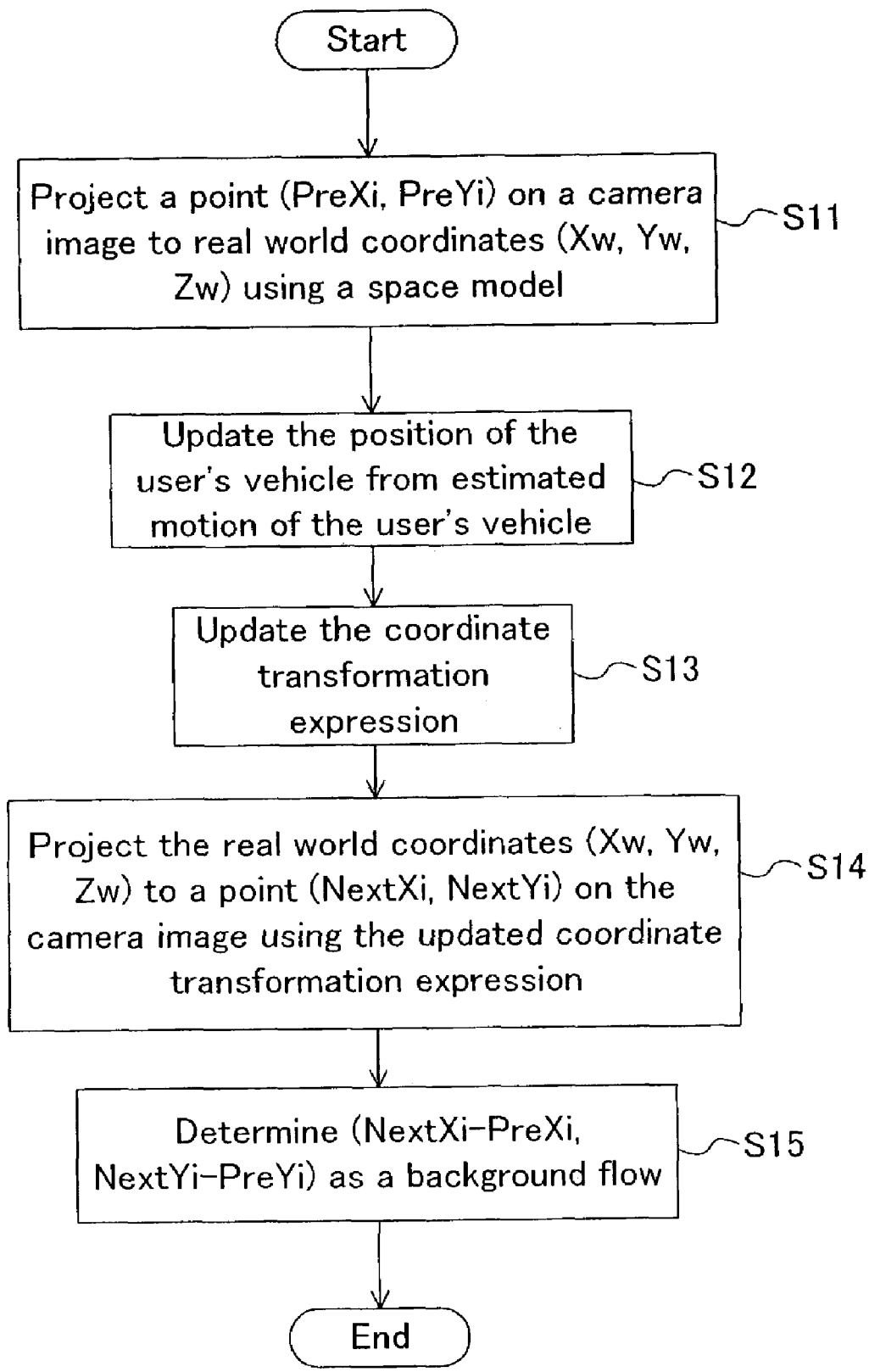
FIG. 4 is a flowchart showing a flow of processing of background flow estimation.
Figure 5:
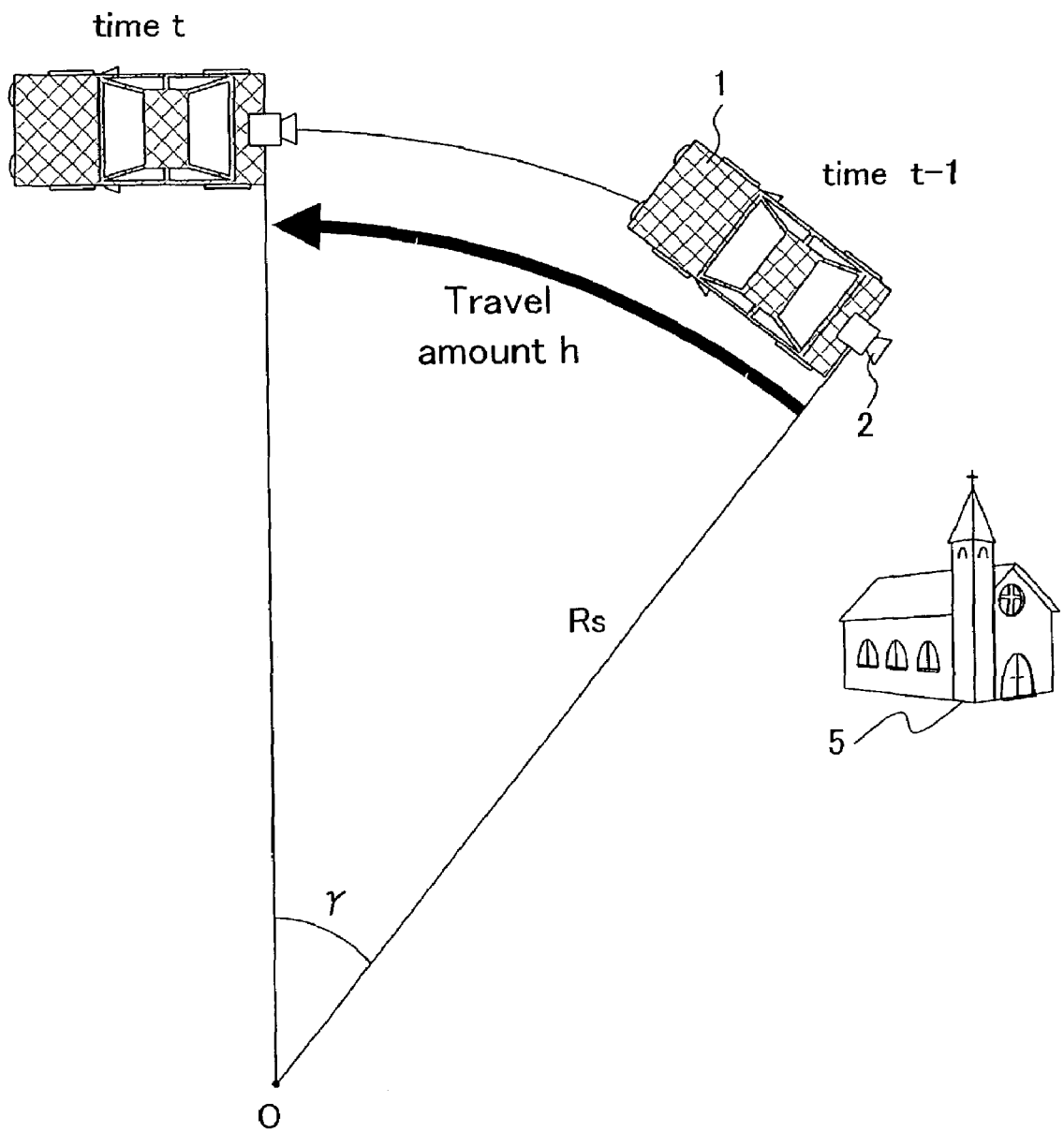
FIG. 5 is a view demonstrating how to estimate a background flow, or a conceptual view illustrating the motion of a vehicle during turning.

FIG. 4 is a flowchart showing the operation of the background flow estimation section 15, and FIG. 5 is a conceptual view of a presumed situation that a vehicle 1 is turning along a curve or the like. In FIG. 5, the motion of a camera 2, which is mounted on the vehicle 1, is identical to the motion of the vehicle 1, and the reference numeral 5 denotes a background object the camera 2 is capturing.

First, an arbitrary point (PreXi, PreYi) on a camera image taken at time t−1 is projected to real world three-dimensional coordinates (Xw, Yw, Zw) using a space model estimated by the space model estimation section 14 (S11). In this projection, the perspective projection transformation represented by expression (1) and the coordinate transformation represented by expression (2) are used. Note that the focal position of the camera in the real world coordinate system in expression (2) corresponds to the focal position of the camera 2 at time t−1.

Thereafter, the position of the user's vehicle in the real world, that is, the focal position of the camera 2 in the real world coordinate system at time t is determined based on the travel amount h of the vehicle 1 from time t−1 to time t estimated by the user's vehicle motion estimation section 13 (S12). The respective constants r in expression (2) are changed based on the determined focal position of the camera 2 in the real world coordinate system (S13). By repeating this processing, the focal position of the camera in the real world coordinate system is kept updated, providing consistently precise position.

Using expression (1) and updated expression (2), the real world coordinates (Xw, Yw, Zw) determined in step S11 are projected back to a point (NextXi, NextYi) on the camera image (S14). The thus-determined camera coordinates (NextXi, NextYi) represent the new position of the point (PreXi, PreYi) at time t−1 on the camera image at time t when the point (PreXi, PreYi) is assumed to be a point in the background object 5 that has not moved from time t−1 to time t. Thus, (NextXi-PreXi, NextYi-PreYi) is determined as a background flow on the assumption that the point (PreXi, PreYi) on the camera image at time t−1 is part of the background (S15).

For simplification of the description, the situation that the vehicle is running along a curve was taken as an example. Determination of a background flow can also be performed in the manner described above in other situations such as that the vehicle is running straight ahead and that it is parking.

<Approaching Object Detection>

Figure 6:
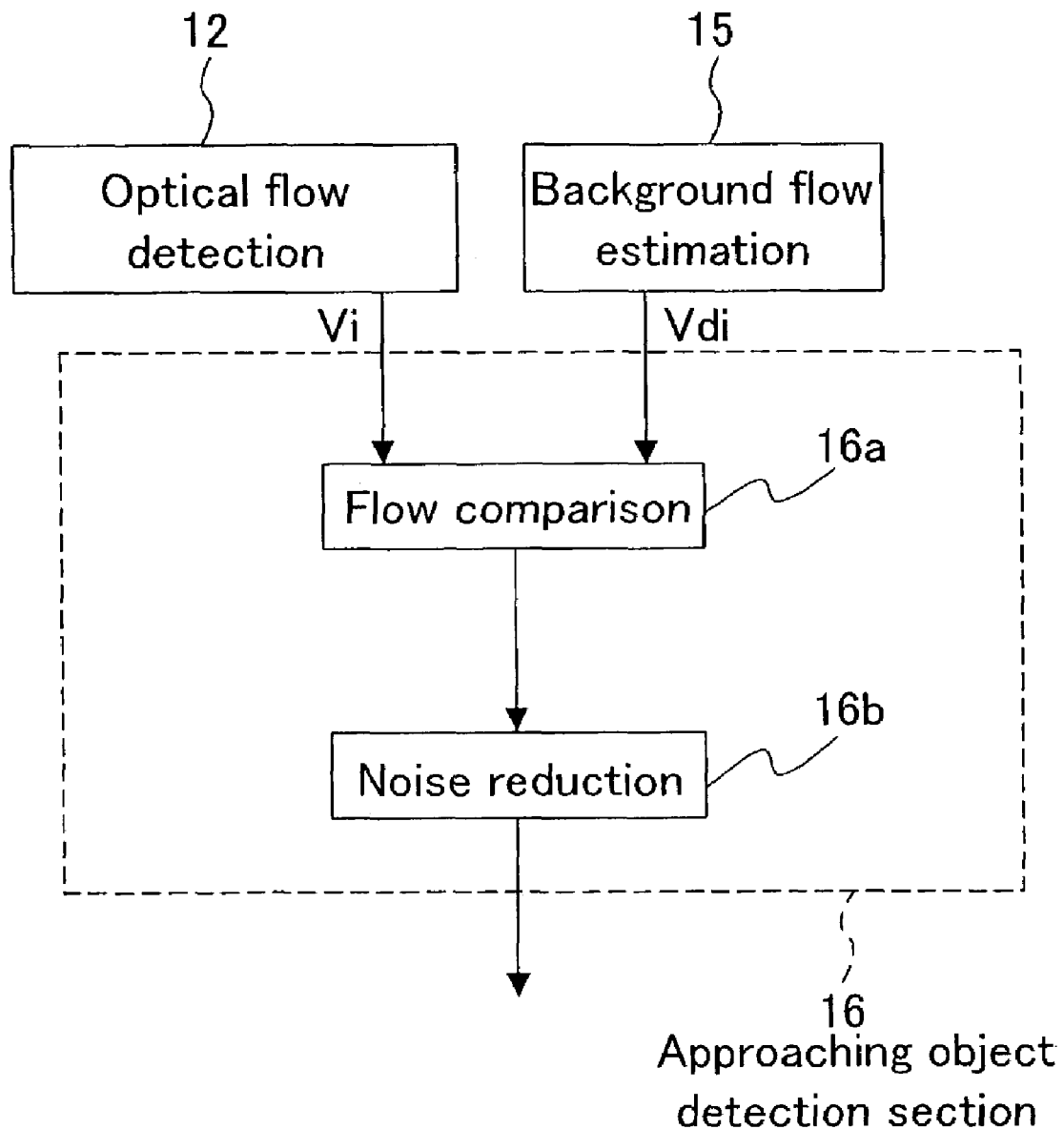
FIG. 6 is a conceptual block diagram of an approaching object detection section.

FIG. 6 is a conceptual block diagram of the approaching object detection section 16. Referring to FIG. 6, a flow comparison portion 16a compares the optical flow Vi actually determined from the camera image by the optical flow detection section 12 with the background flow Vdi determined by the background flow detection section 15, to detect approaching object candidate flows. A noise reduction portion 16b reduces noise from the approaching object candidate flows determined by the flow comparison portion 16a, to detect only an approaching object flow.

Figure 7:
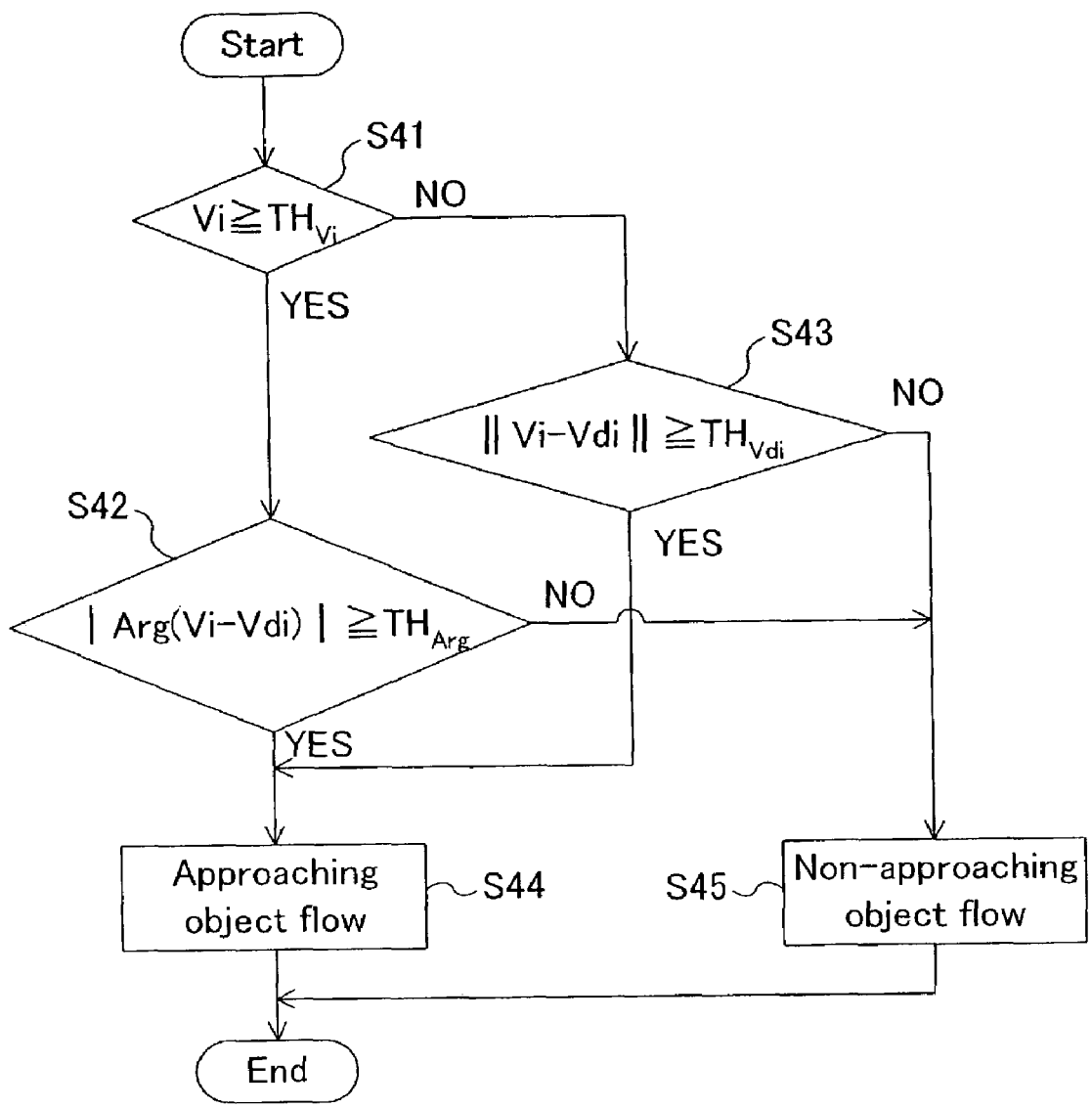
FIG. 7 is a flowchart showing the operation of a flow comparison section.

FIG. 7 is a flowchart showing the operation of the flow comparison portion 16a. In principle, the comparison of the optical flow Vi with the background flow Vdi is performed using the angle difference. However, when the optical flow Vi is small in magnitude, the reliability of the direction information thereof is low, resulting in failure in maintaining the recognition accuracy. For example, the optical flow Vi for a vehicle running alongside the user's vehicle at nearly an equal speed is very small in magnitude, and also the direction of this optical flow changes every instance with the timing at which the image is taken. For example, the optical flow points to the user's vehicle in some instances while pointing to the opposite direction in others. To overcome this problem, in this embodiment, when the optical flow Vi is smaller in magnitude than a predetermined value, the angle difference is not used, but another comparison criterion (S43) is used to improve the reliability of the recognition.

Specifically, first, the magnitude of the optical flow Vi is examined (S41). If the optical flow Vi is sufficiently large (larger than a predetermined value $TH_{Vi}$), which indicates that the optical flow Vi is sufficiently reliable in its direction information, the comparison thereof with the background flow Vdi is performed using the angle difference (S42). In the comparison, if the absolute of the angle difference between the optical flow Vi and the background flow Vdi is equal to or more than a predetermined value $TH_{Arg}$, the optical flow Vi is considered different from the background flow Vdi, and thus recognized to be a flow of an approaching object (S44). If the absolute of the angle difference is sufficiently small (NO in S42), the optical flow Vi is close to the background flow Vdi, and thus recognized not to be a flow of an approaching object (S45). The threshold $TH_{Vi}$ is preferably about 0.1 [pixel], and the threshold $TH_{Arg}$ is preferably about $\pi/2$. The reason why the magnitude information is neglected and only the angle information is used for comparison in the case of YES in step S41 is to eliminate the possibility that a moving object going away from the user's vehicle may be recognized as an approaching object. Naturally, the absolute of the flow vector difference may be used as a recognition criterion.

If the optical flow Vi is not sufficiently large (NO in S41), the angle difference is not usable for comparison with the background flow. In this case, the magnitude of the flow is noted. That is, whether or not the absolute of the vector difference between the optical flow Vi and the background flow Vdi is equal to or more than a predetermined value $TH_{Vdi}$ is determined (S43). If it is equal to or more than the predetermined value $TH_{Vdi}$, the optical flow is recognized to be a flow of an approaching object (S44). Otherwise, it is recognized not to be a flow of an approaching object (S45). As the situation in which the optical flow Vi is small in magnitude and represents an approaching object, the following two cases are considered.

1) An approaching object is running alongside the user's vehicle at nearly an equal speed.

2) An approaching object is running in the distance.

In either case, since the background flow Vdi can be precisely determined, highly accurate recognition of an approaching object can be realized. The threshold $TH_{Vdi}$ is preferably about 0.1 [pixel].

In step S43, since the magnitude of the optical flow Vi is sufficiently small, only the magnitude of the background flow Vdi may be compared with a predetermined value, not the absolute of the vector difference between the optical flow Vi and the background flow Vdi. In this case, the optical flow may be recognized to be a flow of an approaching object if the background flow Vdi is sufficiently large, and recognized not to be a flow of an approaching object if it is sufficiently small.

The thresholds $TH_{Vi}$, $TH_{Arg}$ and $TH_{Vdi}$ used for the flow comparison described above may be set as the function of the position on an image. For example, the thresholds $TH_{Vi}$ and $TH_{Vdi}$ may be set small for a position at which the background flow Vdi is small, and may be set large for a position at which the background flow Vdi is large. This enables precise recognition of an object in the distance while allowing suppression of noise influence.

Figure 8:
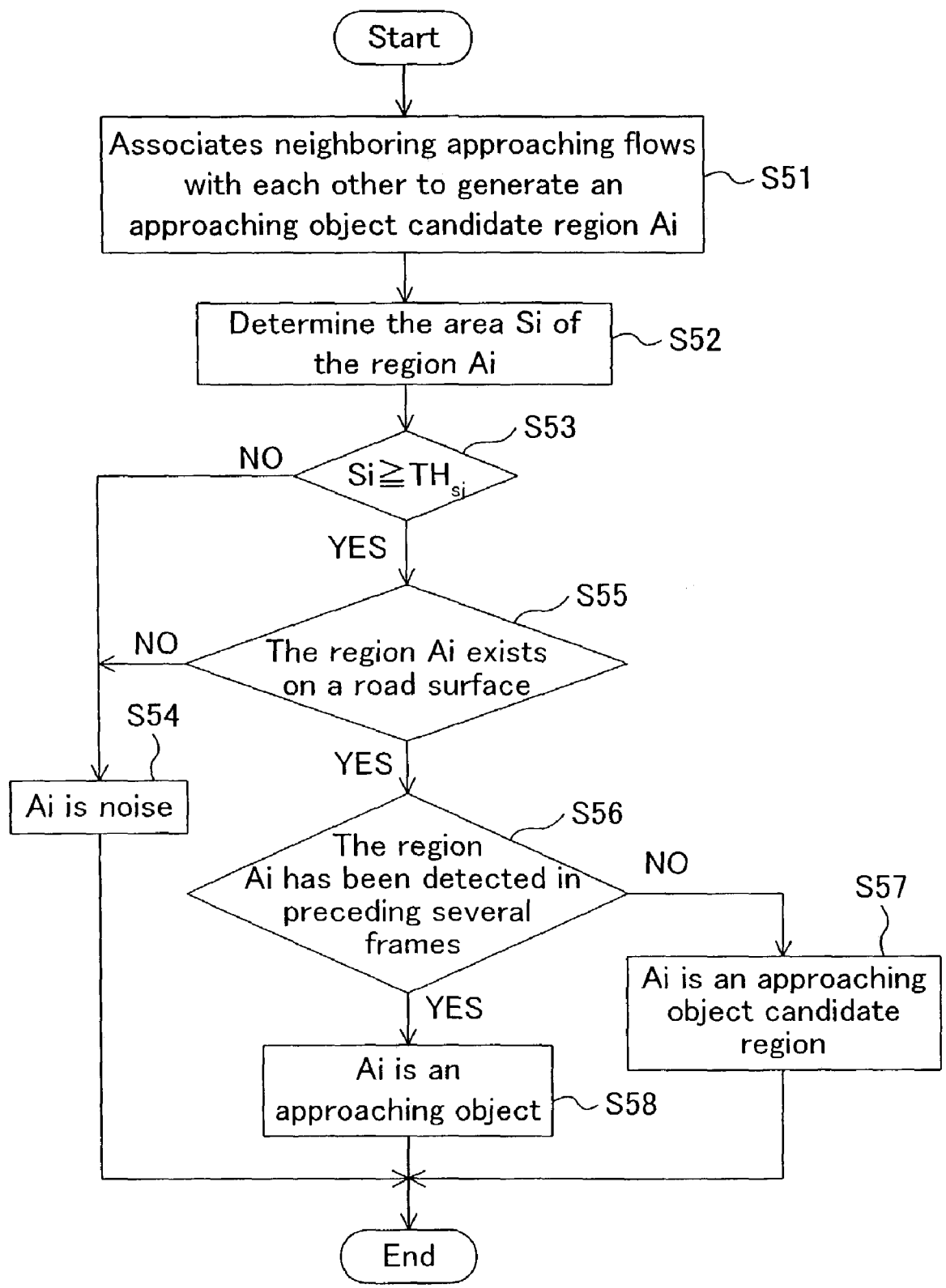
FIG. 8 is a flowchart showing the operation of a noise reduction section.

FIG. 8 is a flowchart showing the operation of the noise reduction portion 16b. Since noise is included in those detected as approaching object flows by the flow comparison portion 16a, the detection accuracy will be degraded if all of them are accepted as approaching objects. The noise reduction portion 16b prepares a model of noise and an approaching object and compares the model with approaching object flows (approaching object candidate flows) detected by the flow comparison portion 16a, to detect only an approaching object.

First, if an approaching object candidate flow is noise, approaching object candidate flows similar to this flow will not be detected in succession temporally or spatially. On the contrary, if an approaching object candidate flow is not noise but related to an actual approaching object, which has some degree of dimensions, similar approaching object candidate flows should occupy an area corresponding to the dimensions of the approaching object spatially.

In view of the above, neighboring approaching object candidate flows are associated with each other, and portions related to the associated approaching object candidate flows are combined together, to provide a combined approaching object candidate region Ai (S51). The area Si of the approaching object candidate region Ai is obtained (S52), and is compared with a predetermined value $TH_{Si}$ (S53). At this time, the predetermined value $TH_{Si}$ is set small when the approaching object candidate region Ai is apart from the camera, and set large when it is near the camera. If the area Si is less than the predetermined value $TH_{Si}$ (NO in S53), the region Ai is determined as noise (S54). If the area Si is equal to or more than the predetermined value $TH_{Si}$, the process proceeds to step S55.

In step S55, noise reduction is performed by modeling the approaching object. Since the camera is mounted on the vehicle, approaching objects should be cars, motorcycles, bicycles and the like, which are all objects running on a road. In view of this, whether or not the approaching object candidate region Ai exists on a road is surface in a space model is determined (S55). If not, the region Ai is determined as noise (S54), and the process proceeds to processing of the next frame. If at least part of the approaching object candidate region Ai exists on a road surface, the process proceeds to step S56.

In step S56, filtering in the time direction is performed. An approaching object will never appear or disappear abruptly on the screen. Therefore, the region of an approaching object should exist on several continuous frames. FIGS. 9A to 9D show a situation in which a vehicle is approaching to the user's vehicle from the rear during straight-ahead running. At time t, an approaching car 6 on an image is as shown in the left view of FIG. 9A, for which an approaching object candidate region At is detected as shown in the right view of FIG. 9A. At times t−1, t−2, . . . , t−N a little before the current time t, approaching object candidate regions $A_{t-1}$, $A_{t-2}$, . . . , $A_{t-N}$ are detected as shown in FIGS. 9B, 9C and 9D, respectively. Assuming that the time intervals are sufficiently small, the approaching car 6 does not move so largely on the image, allowing the respective regions $A_{t-1}$, $A_{t-2}$, . . . , $A_{t-N}$ to partly overlap the region At. If an approaching object candidate region has been generated due to vibration of the camera and the like, the candidate region should be detected only for a short time.

In view of the above, the percentage at which an approaching object region candidate exists in a region of a frame corresponding to the approaching object candidate region Ai is compared with a predetermined value for preceding several frames. (S56). If the percentage is lower than the predetermined value, the possibility that the approaching object candidate region Ai is an approaching object is low. Therefore, this approaching object candidate region Ai is left behind (S57), and the process proceeds to processing of the next frame. If the percentage is higher than the predetermined value in preceding several frames, the approaching object candidate region Ai is determined related to an approaching object, and the process proceeds to processing of the next frame (S58). For example, the approaching object candidate region is determined as an approaching object when six or more frames out of ten are acceptable.

If it is assumed that the camera is mounted to point to the front or rear from the vehicle and that approaching objects are only passenger cars, images of approaching objects taken with the camera are only those of passenger cars viewed from front or rear. In this case, the size of the approaching object region can be limited to about 2 m in width and about 1.5 m in height from the road surface. In view of this, the size of the approaching object candidate region may be set at this size, and the position of the approaching object candidate region may be set so that the number of approaching object flows existing within the region is maximum. By setting in this way, whether an approaching object or noise can be determined depending on whether or not the number of approaching object flows included in the approaching object candidate region is larger than a predetermined value. This processing may be executed in place of steps S51 to S53.

As described above, in this embodiment, the motion of an object existing in the surroundings of a vehicle can be detected accurately by comparing an optical flow actually determined from a camera image with a background flow.

Even when the vehicle is running along a curve, an approaching object can be detected precisely because the detection is performed by comparing an optical flow with a background flow at each point on an image. As for an object of which an optical flow determined from an image is small in magnitude, such as a vehicle running alongside the user's vehicle and a distant approaching object, the optical flow is greatly different from the background flow at the point on the image. Therefore, such an object can be easily detected.

<Other Examples of Background Flow Estimation>

EXAMPLE 1

Figure 10:
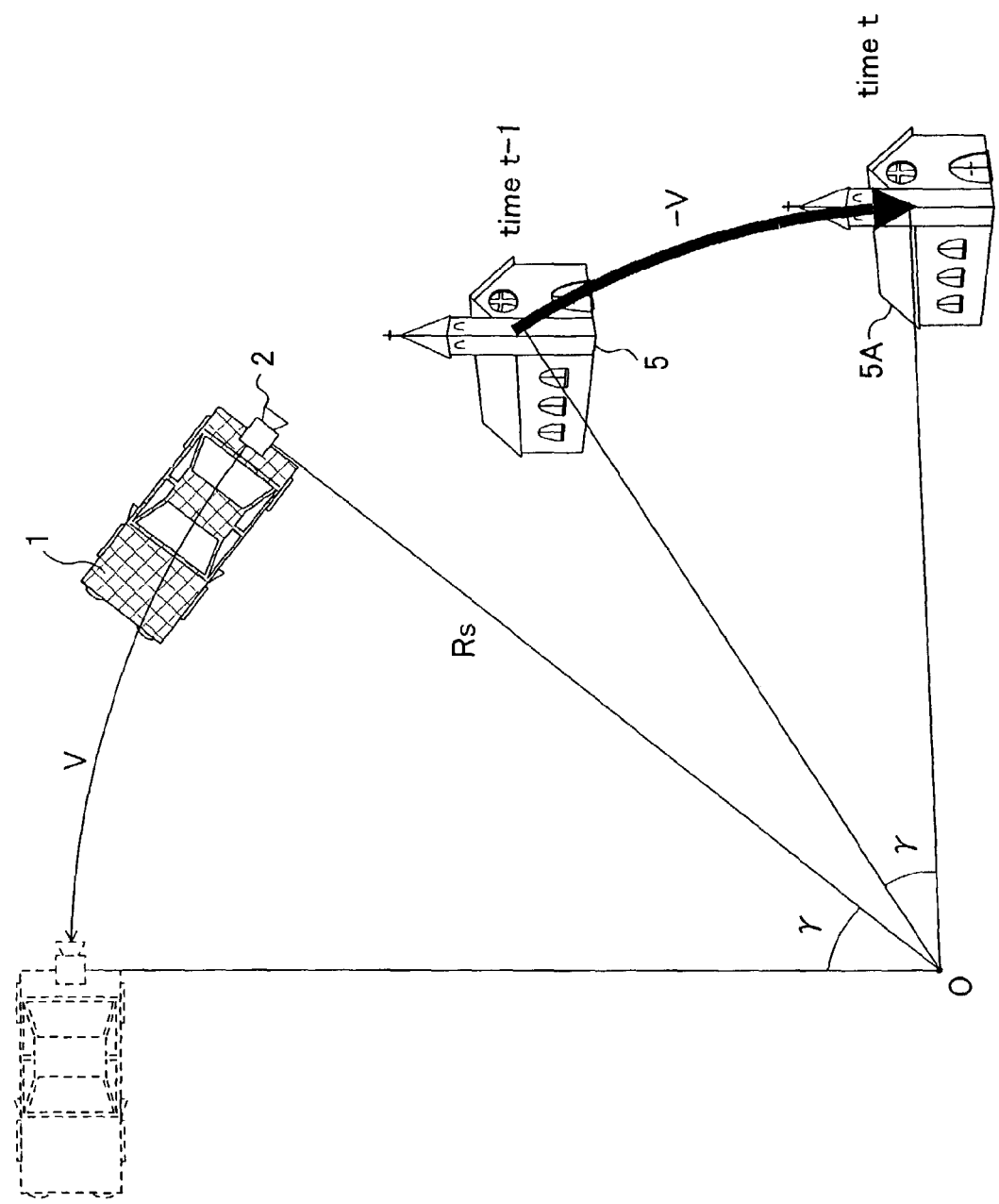
FIG. 10 is a conceptual view demonstrating how to estimate a background flow.

The optical flow determined in the case shown in FIG. 5, in which the camera 2 moves at the turning radius Rs and the turning angle γ and the object 5 the camera 2 is capturing does not move at all, is equal to the optical flow to be determined when the camera 2 does not move but the object 5 the camera 2 is capturing moves at the turning angle γ as shown in FIG. 10. In other words, the optical flow determined when the camera moves by a vector V in the real world coordinate system is equal to the optical flow determined when all objects the camera is capturing move by a vector −V.

Figure 11:
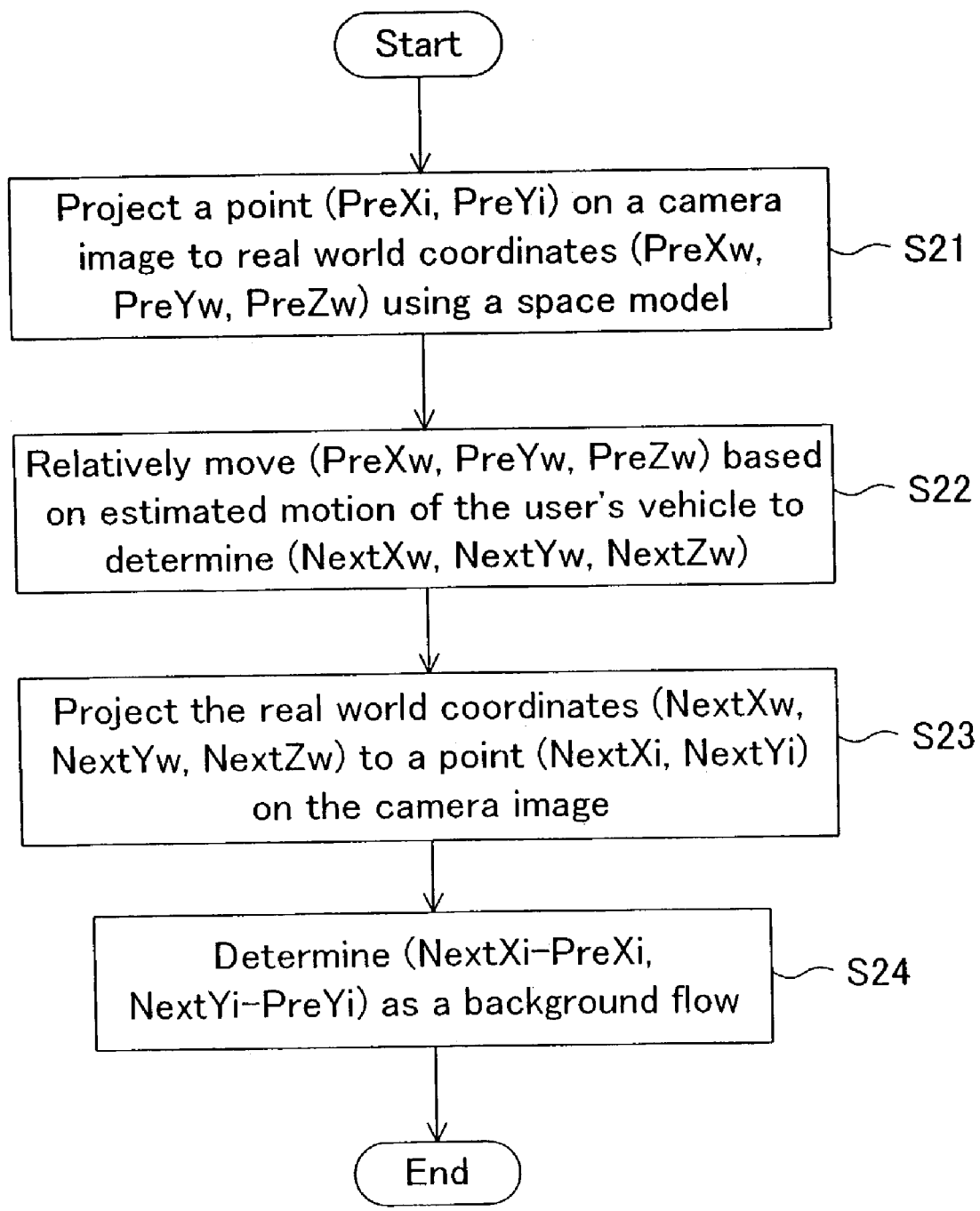
FIG. 11 is a flowchart showing another flow of processing of background flow estimation.

In view of the above, the background flow may be determined, not based on the motion of the camera, but by moving the space model assuming that the camera is immobilized. FIG. 11 is a flowchart showing processing of background flow estimation adopted in this case.

First, as in step S11 in FIG. 4, an arbitrary point (PreXi, PreYi) on a camera image taken at time t−1 is projected to real world three-dimensional coordinates (PreXw, PreYw, PreZw) using the space model estimated by the space model estimation section 14 (S21). In this projection, the perspective projection transformation represented by expression (1) and the coordinate transformation represented by expression (2) are used.

Thereafter, the position of the real world three-dimensional coordinates (PreXw, PreYw, PreZw) determined in step S21 is relatively moved with respect to the vehicle 1 based on the travel amount h of the vehicle 1 from time t−1 until time t. In other words, the position of the real world three-dimensional coordinates (PreXw, PreYw, PreZw) is rotated around the rotation center coordinates o at the rotational angle γ corresponding to the travel amount h, to determine real world coordinates (NextXw, NextYw, NextZw) (S22). The position of the real world coordinates (NextXw, NextYw, NextZw) determined in step S22 is then projected back to a point (NextXi, NextYi) on the camera image (S23). Thereafter, as in step S15 in FIG. 4, (NextXi−PreXi, NextYi−PreYi) is determined as a background flow (S24).

It is possible to regard the coordinates (NextXw, NextYw, NextZw) determined in step S22 as a space model at time t predicted from the space model at time t−1. Therefore, by continuing the processing described above, the space model may be updated. This updating of the space model may be performed only for the portion determined as a background by the approaching object detection section 16, while the method for re-determination of the space model described above may be adopted for the remaining portion.

EXAMPLE 2

Figure 12:
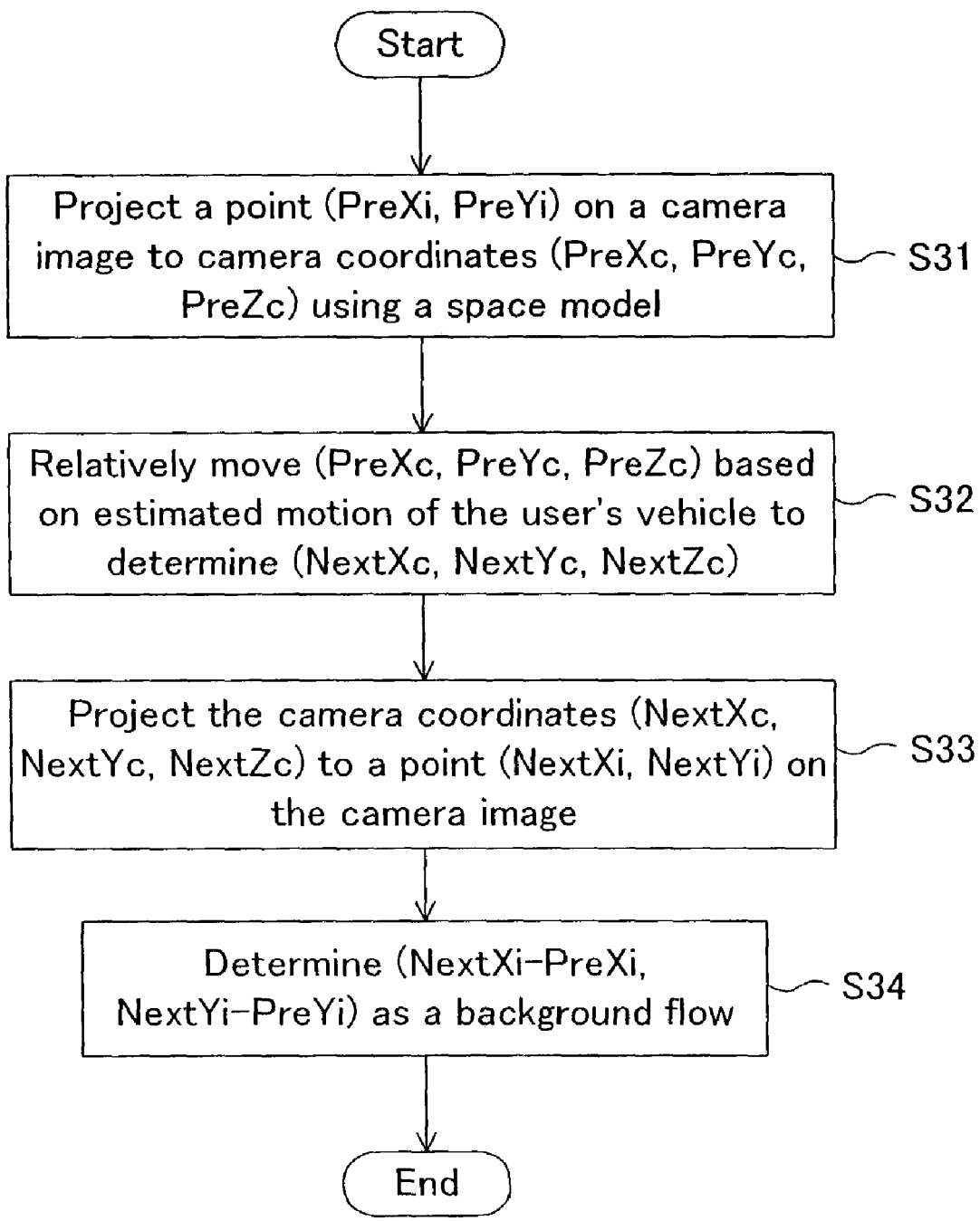
FIG. 12 is a flowchart showing yet another flow of processing of background flow estimation.

In the two methods described above, a point on a camera image was transformed to real world three-dimensional coordinates, and a space model assumed in the real world three-dimensional coordinate system was used for the processing. As an alternative method, the entire processing may be performed in the camera coordinate system. FIG. 12 is a flowchart showing the processing of background flow estimation in this method. According to this method, the space model must be expressed in the camera coordinate system. Since the camera coordinate system is in one-to-one correspondence with the real world coordinate system, the space model assumed in the real world coordinate system can be easily transformed to the camera coordinate system according to expression (2).

First, an arbitrary point (PreXi, PreYi) on a camera image taken at time t−1 is projected to a three-dimensional position (PreXc, PreYc, PreZc) in the camera coordinate system using a space model expressed in the camera coordinate system (S31). In this projection, the perspective projection transformation represented by expression (1) is used.

Thereafter, the camera coordinates (PreXc, PreYc, PreZc) determined in step S31 is relatively shifted with respect to the vehicle 1 based on the travel amount h of the vehicle 1 from time t−1 until time t. In other words, the position of the camera coordinates (PreXc, PreYc, PreZc) is rotated around the rotation center coordinates o at a rotational angle $γ_c$ in the camera coordinate system corresponding to the travel amount h, to determine camera coordinates (NextXc, NextYc, NextZc) (S32). The position of the camera coordinates (NextXc, NextYc, NextZc) determined in step S32 is then projected back to a point (NextXi, NextYi) on the camera image (S33). Thereafter, as in step S15 in FIG. 4, (NextXi−PreXi, NextYi−PreYi) is determined as a background flow (S34).

As described above, the space model is used for transformation from a camera image to the real world coordinate system or from a camera image to the camera coordinate system. It is therefore possible to express the space model in the form of a transformation expression from a camera image to the real world coordinate system or a transformation expression from a camera image to the camera coordinate system.

Figure 13:
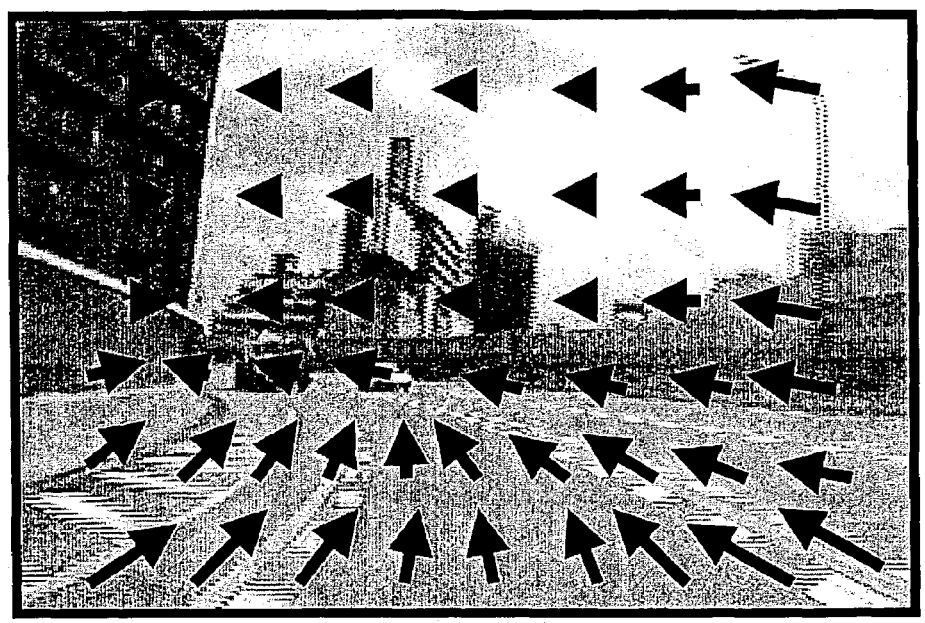
FIG. 13 is an example of a camera image with background flows displayed according to the present invention.

FIG. 13 is an example of a camera image with background flows according to the present invention indicated as arrows. As described before, a background flow is used for comparison with an optical flow actually determined from a camera image and serves as a detection criterion for an approaching object. As is found from FIG. 13, the background flows reflect the curve of the road. In other words, it is directly understood from FIG. 13 that the method according to the present invention can detect an approaching object accurately even on a curve, compared with the prior art.

According to the present invention, only an object approaching the user's vehicle can be detected precisely. Using the detection results, an image emphasizing only an approaching car may be displayed, or existence of an approaching car may be warned with sound, image display, vibration of the steering wheel and/or the seat, lighting of a hazard lamp such as a LED or the like, for example. Further, in a hazardous situation, the steering wheel and/or the brake may be switched to automatic control to evade contact or collision with an approaching car.

Hereinafter, emphasizing display using background flows will be described.

Figure 38:
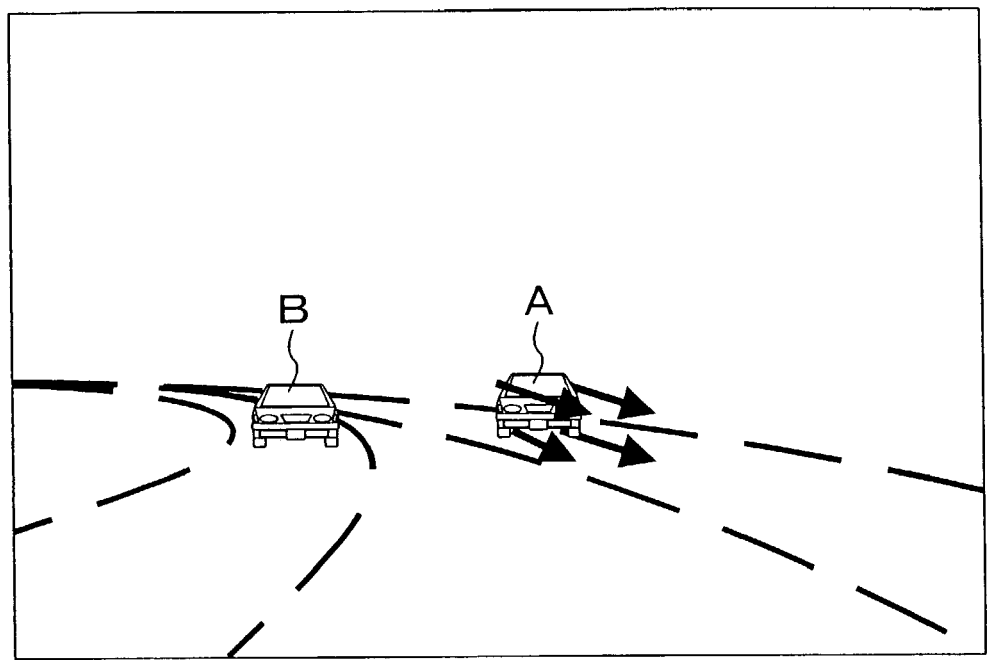
FIG. 38 is an example of superimposition of optical flows for an approaching vehicle on a camera image during curve running.

FIG. 38 shows an example of an image in the rear from the user's car running along a curve, in which only optical flows corresponding to an approaching vehicle are superimposed. In FIG. 38, vehicles A and B apart from the user's vehicle by nearly an equal distance are approaching the user's vehicle at nearly an equal speed. As shown in FIG. 38, the user can recognize the approach of the vehicle A running on the outer lane of the curve by optical flows (arrows) superimposed. However, the user cannot recognize the approach of the vehicle B running on the inner lane of the curve because the optical flow for this vehicle is substantially zero. It is therefore found that during curve running, mere superimposition of optical flows may sometimes fail in recognizing existence of an approaching object.

Figure 39:
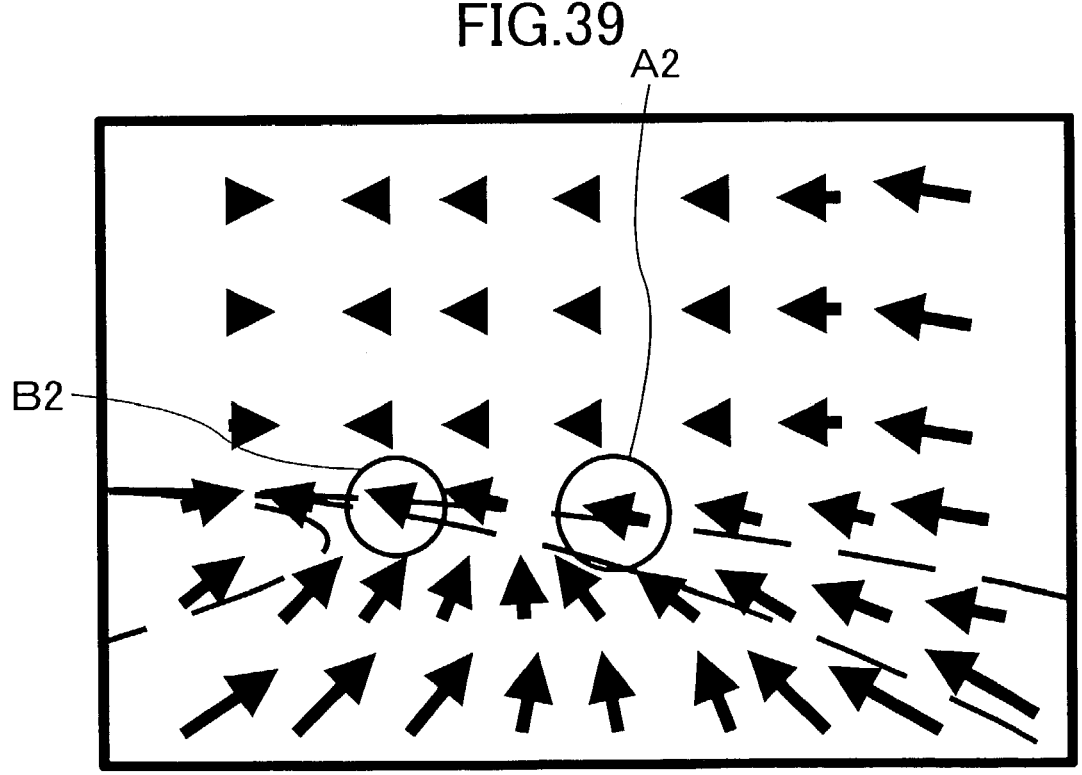
FIG. 39 shows background flows on the image of FIG. 38.

The reason for the above is that background flows generated by running of the user's vehicle along a curve and flows generated by the motion of the approaching vehicle cancel each other. FIG. 39 shows the background flows in the case of FIG. 38. In FIG. 39, arrows A2 and B2 represent background flows corresponding to the positions of the vehicles A and B, respectively. As is found from FIG. 39, the background flow B2 at the position of the vehicle B is opposite in direction to the motion of the vehicle B.

Figure 40:
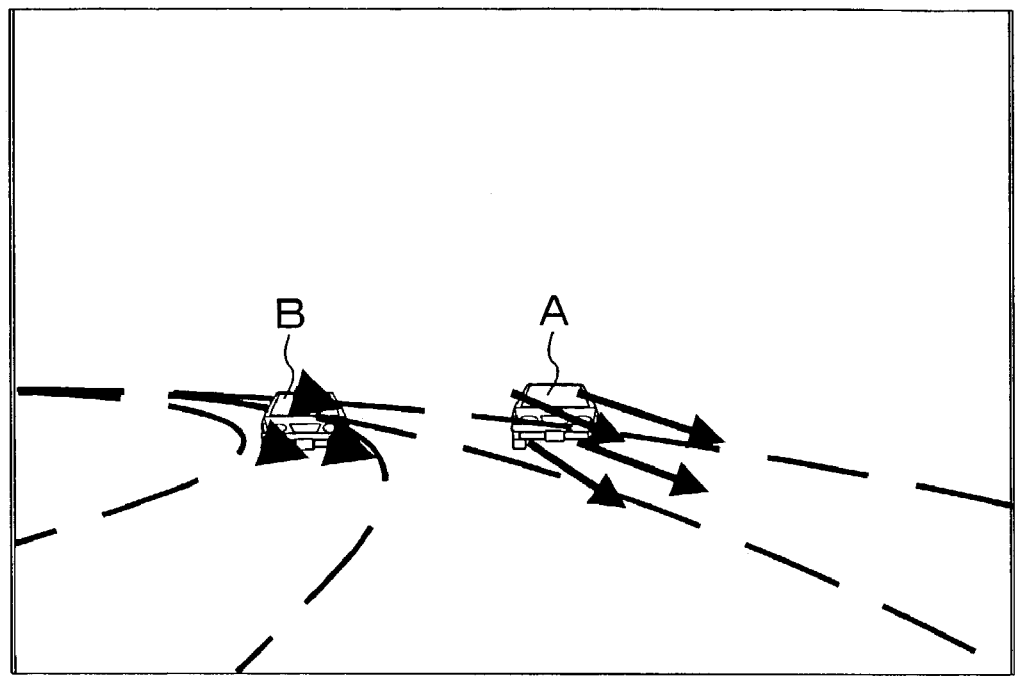
FIG. 40 is an example of superimposition of flows determined by subtracting the background flows on the camera image.

To make only the motion of an approaching vehicle conspicuous, the background flows are subtracted in terms of vector from the determined optical flows, and the resultant flows are superimposed on the camera image. FIG. 40 is an example of the resultant display. Unlike FIG. 38, flows are displayed for both the vehicles A and B, so that the user can recognize existence of the approaching vehicles without fail.

Figure 26A:
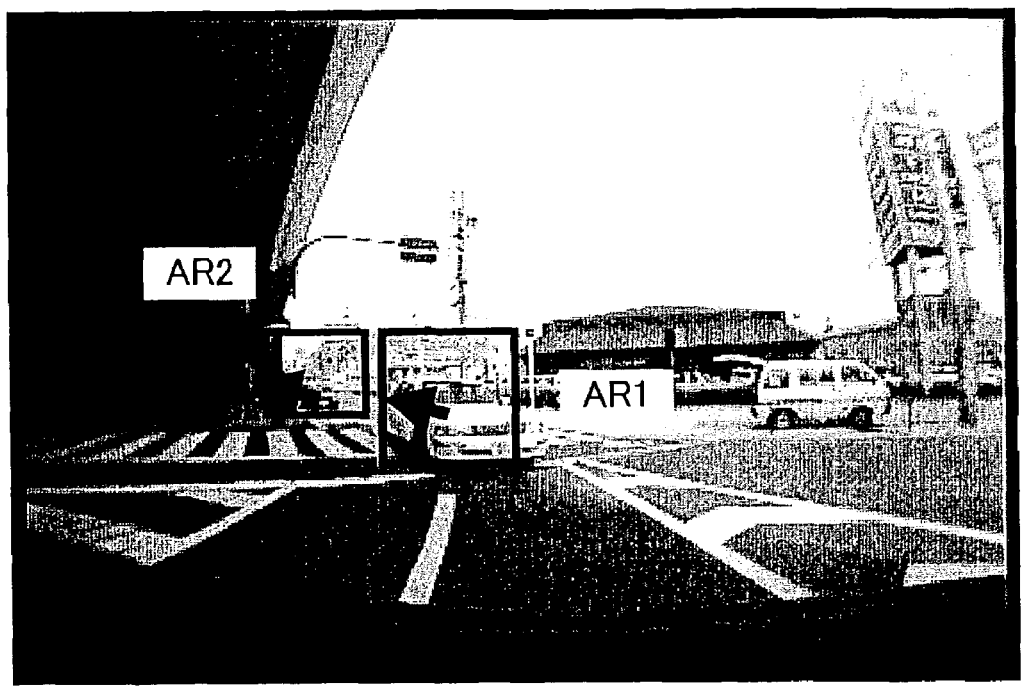
FIGS. 26A and 26B are views showing the results of detection of approaching objects from the camera image of FIG. 24 according to the present invention.
Figure 26B:
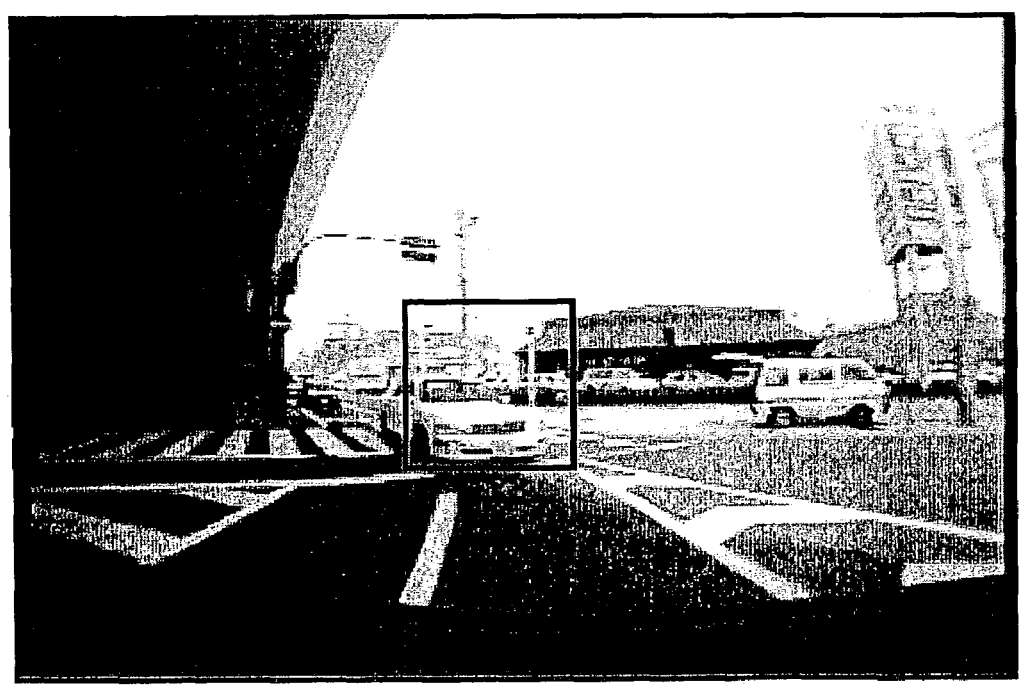

Naturally, it is also possible to combine approaching object flows together as described above to determine an approaching object region, and emphasize the approaching object region by framing the approaching object region as shown in FIG. 26B to be described later. Further, as the approaching object flow or the approaching object region is larger in magnitude, the approaching vehicle is considered closer and thus the risk factor is considered higher. Therefore, the color, line thickness, line type and the like of the frame may be switched with the magnitude of the approaching object flow and the approaching object region.

In place of an image or together with an image, sound may be used for warning. In this case, it is effective if sound is heard from the direction in which an approaching object exists. The magnitude, melody, tempo, frequency and the like of the sound may be changed with the risk factor. For example, when a car is gradually approaching from the rear on the right, small sound may be generated from behind the user on the right. When a car is rapidly approaching from the rear on the left, large sound may be generated from behind the user on the left.

In this embodiment described above, the motion of the user's vehicle was estimated from the rotational speed of the wheels and the steering angle of the steering wheel. Alternatively, an image taken with the camera mounted on the vehicle may be used to detect the motion of the vehicle (camera itself). This technique will be described.

Under the assumption that an expression representing the road surface as a rest plane is known and that the motion of the vehicle is minute, a motion parameter of the vehicle (camera) is estimated from the motion of a point on the road surface on an image. The generality will not be lost by this assumption because even if the vehicle is running at high speed, the motion of the camera will be minute between images by increasing the frame rate during capturing.

Figure 41:
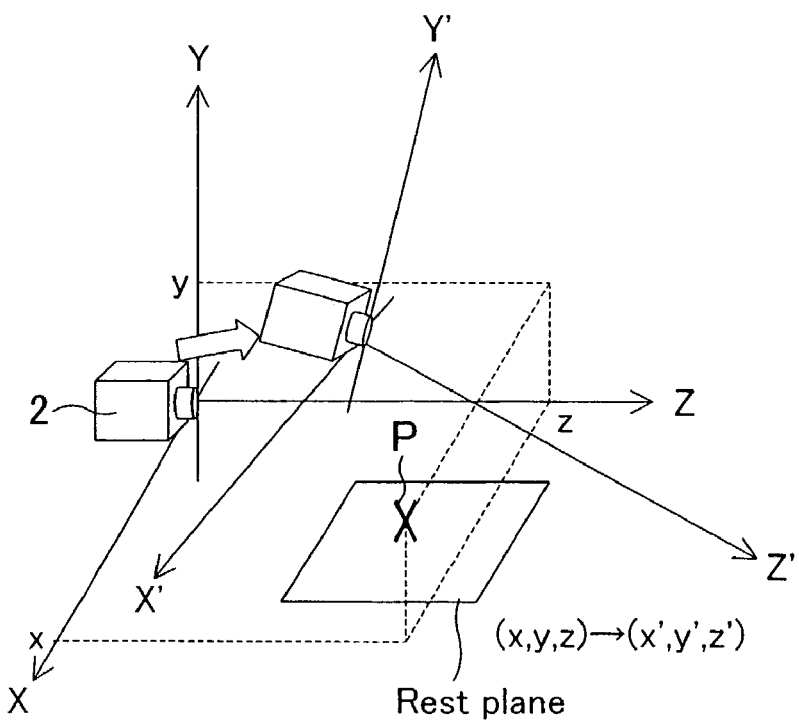
FIG. 41 is a conceptual view demonstrating how to detect the motion of the vehicle using a camera image.

FIG. 41 is a diagrammatic view demonstrating the technique described above. As shown in FIG. 41, assume that the coordinate value at a point P on a rest plane in the camera coordinate system changes from PE=(x, y, z) to PE' (x', y', z'). The motion of a camera 2 is represented by rotation R (wx, wy, wz) and translation (Tx, Ty, Tz). That is, the motion of the camera 2 is expressed as follows.

$$\begin{pmatrix} x' \\ y' \\ z' \\ 1 \end{pmatrix} \cong \begin{pmatrix} 1 & wz & -wy & t_X \\ -wz & 1 & wx & t_Y \\ wy & -wx & 1 & t_Z \\ 0 & 0 & 0 & 1 \end{pmatrix} \begin{pmatrix} x \\ y \\ z \\ 1 \end{pmatrix},$$

$$\begin{pmatrix} t_X \\ t_Y \\ t_Z \end{pmatrix} \cong \begin{pmatrix} 1 & wz & -wy \\ -wz & 1 & wx \\ wy & -wx & 1 \end{pmatrix} \begin{pmatrix} -Tx \\ -Ty \\ -Tz \end{pmatrix}$$

Assuming that the rest plane is expressed by z=ax+by+c, the following expressions are established for the shift of the point P, (u, v)→(u', v') in the image coordination system.

$$u' = \frac{(1 - a't_X)u + (wz - b't_X)v + (-wy + c't_X)f}{\frac{1}{f}(wy - a't_Z)u + \frac{1}{f}(-wx - b't_X)v + (1 + c't_Z)}$$

$$v' = \frac{(-wz - a't_Y)u + (1 - b't_Y)v + (-wx + c't_Y)f}{\frac{1}{f}(wy - a't_Z)u + \frac{1}{f}(-wx - b't_Z)v + (1 + c't_Z)}$$

$$a' = \frac{a}{c}, b' = \frac{b}{c}, c' = \frac{1}{c}$$

Assuming that the corresponding points (u, v) and (u', v') in the image coordinate system and the coefficients a, b and c of the expression representing the rest plane are known, the above expressions can be reorganized in terms of the unknown parameters (wx, wy, wz, tx, ty, tz) as follows.

$$(1-a't_X)u+(wz-b't_X)v+(-wy+c't_X)f-(wy-a't_Z)\frac{uu'}{f}-(-wx-b't_Z)\frac{vu'}{f}-(1+c't_Z)u'=0$$

$$(-wz-a't_Y)u+(1-b't_Y)v+(wx+c't_Y)f-(wy-a't_Z)\frac{uv'}{f}-(-wx-b't_Z)\frac{vv'}{f}-(1+c't_Z)v'=0$$

$$\left(\frac{vu'}{f}\right)wx+\left(-f-\frac{uu'}{f}\right)wy+(v)wz+(-a'u-b'v+c'f)t_X+\left(\frac{a'u}{f}+\frac{b'v}{f}-c'\right)u't_Z+(u-u')=0$$

$$\left(f+\frac{vv'}{f}\right)wx+\left(-\frac{uv'}{f}\right)wy+(-u)wz+(-a'u-b'v+c'f)t_Y+\left(\frac{a'u}{f}+\frac{b'v}{f}-c'\right)v't_Z+(v-v')=0$$

$$\begin{pmatrix}\frac{vu'}{f} & -f-\frac{uu'}{f} & v & -a'u-b'v+c'f & 0 & \left(\frac{a'u}{f}+\frac{b'v}{f}-c'\right)u' \\ f+\frac{vv'}{f} & -\frac{uv'}{f} & -u & 0 & -a'u-b'v+c'f & \left(\frac{a'u}{f}+\frac{b'v}{f}-c'\right)v' \\ \vdots & & & & & \end{pmatrix}\begin{pmatrix}wx\\wy\\wz\\t_X\\t_Y\\t_Z\end{pmatrix}=\begin{pmatrix}u'-u\\v'-v\\\vdots\end{pmatrix}$$

By expressing the above as AC=R, the term of the rotation and the translation 5 representing the motion of the vehicle can be computed using the method of least squares.

$$C=(A^tA)^{-1}A^tR$$

EMBODIMENT 2

Figure 14:
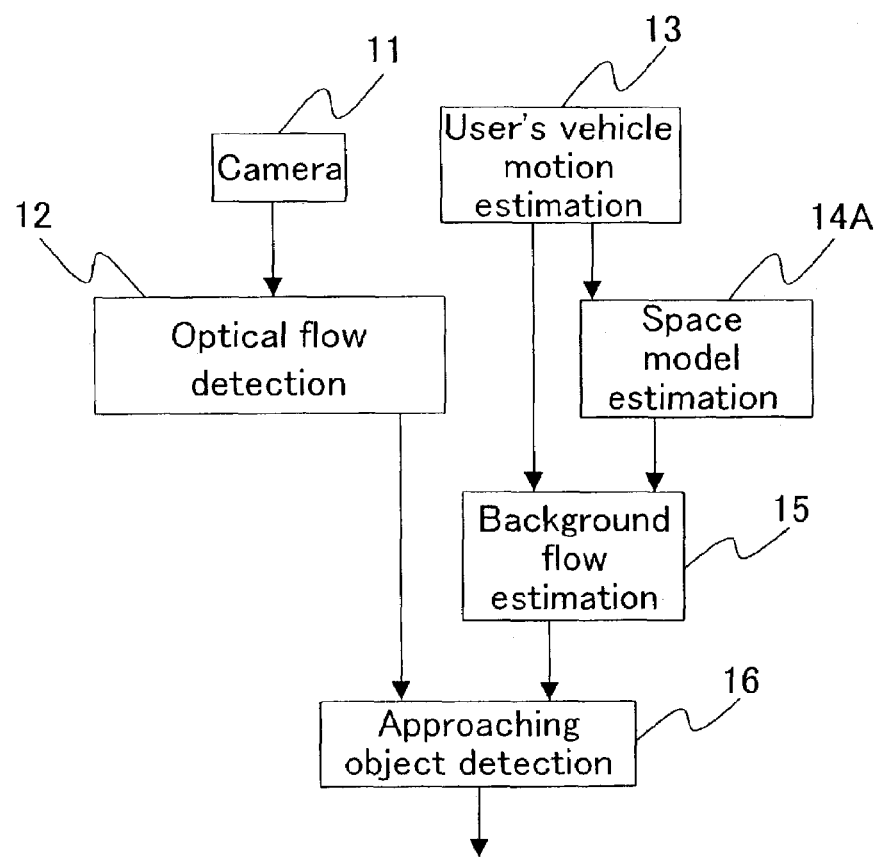
FIG. 14 is a block diagram of a monitoring device of Embodiment 2 of the present invention.

FIG. 14 is a block diagram conceptually showing the basic configuration of a monitoring device for vehicles of Embodiment 2 of the present invention. In FIG. 14, the same components as those in FIG. 1 are denoted by the same reference numerals, and the description thereof is omitted here. This embodiment is different from Embodiment 1 in that a space model estimation section 14A estimates a comparatively simple space model using user's vehicle motion information estimated by the user's vehicle motion estimation section 13.

In general, various objects such as buildings, utility poles, signboards and trees exist on the road surface in the circumstances in which a vehicle runs. The camera 11 therefore captures various objects such as the road surface, buildings, utility poles, signboards, trees and the sky. Herein, a method for presuming various objects captured by the camera 11 using a simple space model will be described.

Among various objects captured by the camera, the "road surface on which the vehicle has run" will be captured almost without fail when the camera is placed to point to the rear downward. Therefore, a "road surface model" modeling the road surface on which the vehicle has run is first used as a space model. The road surface model, which includes infinite extension of the road surface, can be precisely estimated as long as there is no abrupt change in gradient. Even for a road changing in gradient, like a slope and a severe up and down road, a road surface model considering the influence of the gradient of the road surface can be prepared using a sensor such as a gyro sensor.

However, such a road surface model is not necessarily usable for the entire region of the camera image. The reason is as follows. It is considered that the camera is normally placed in a nearly horizontal state. In this case, the road surface does not exist in the portion of the camera image higher than the horizon. Naturally, the camera can be placed so that the road surface occupies the entire region of the camera image. However, this placement narrows the coverage allowing monitoring with the camera and thus is not practical.

In this embodiment, a wall normal to the road surface is presumed as a space model in addition to the road surface model. This space model is hereinafter called a "wall model".

Figure 15:
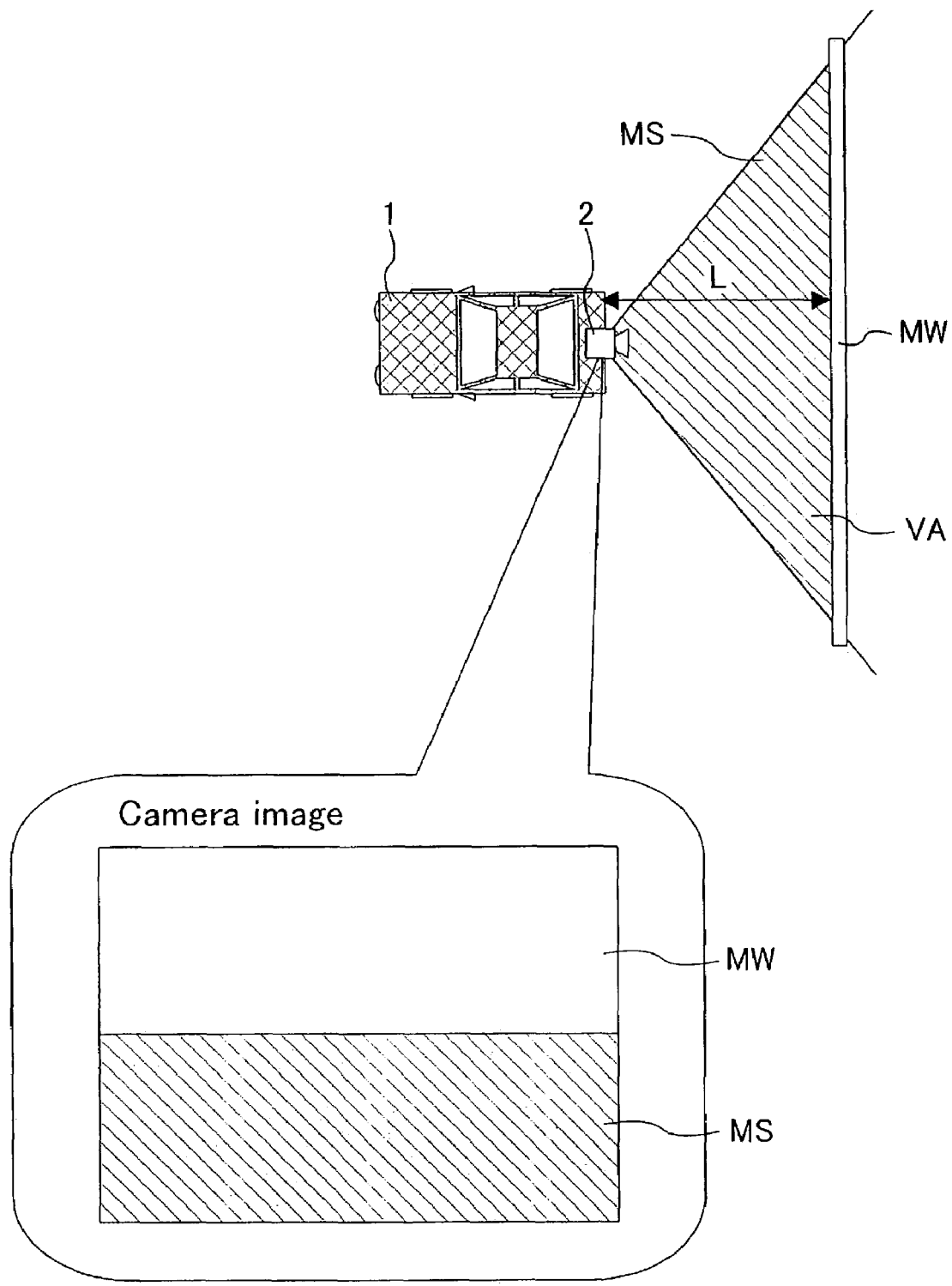
FIG. 15 is a view showing an example of a space model according to the present invention.

FIG. 15 is a view showing an example of the wall model. Referring to FIG. 15, range VA defined by two straight lines extending from a camera 2 mounted on a vehicle 1 is the coverage the camera 2 can capture. A wall model MW shown in FIG. 15 is the simplest wall model, in which a wall normal to the road surface is presumed at a position in the rear from the vehicle 1 by a distance L. The wall model MW is presumed to be large enough to cover all the region of the coverage VA of the camera 2 that are not covered with the road surface model MS. The region of the coverage VA of the camera 2 expanding between the camera 2 and the wall model MW constitutes the region of the road surface model MS. Therefore, when the vehicle 1 is running straight ahead, the camera image taken with the camera 2 is composed of the wall model MW in the upper part and the road surface model MS in the lower part.

Figure 16A:
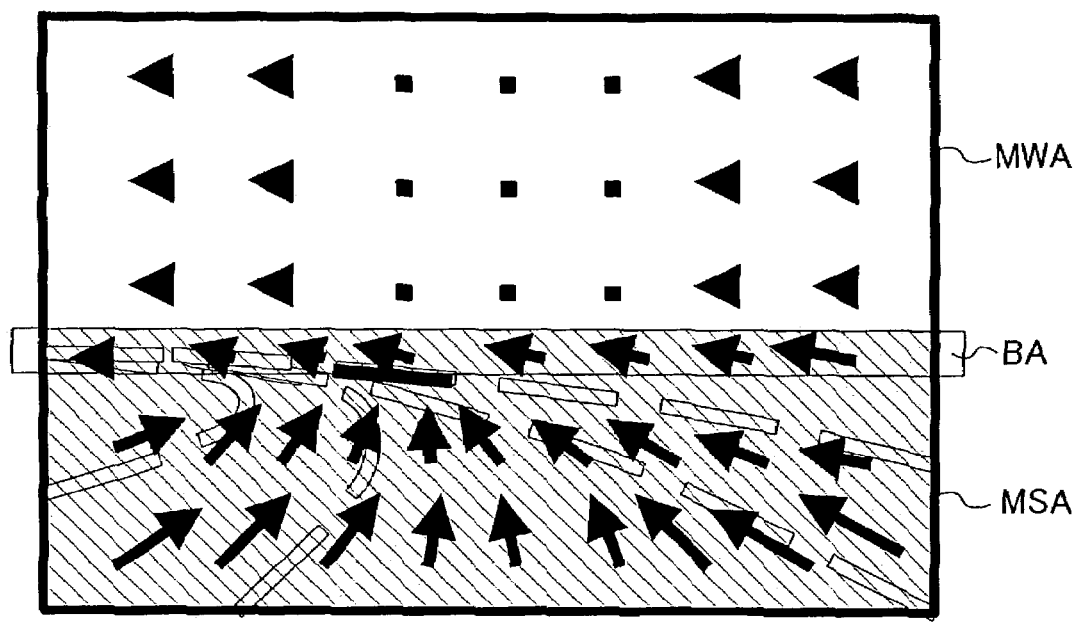
FIGS. 16A and 16B are views showing the relationship between the distance L and background flows in the space model of FIG. 15.
Figure 16B:
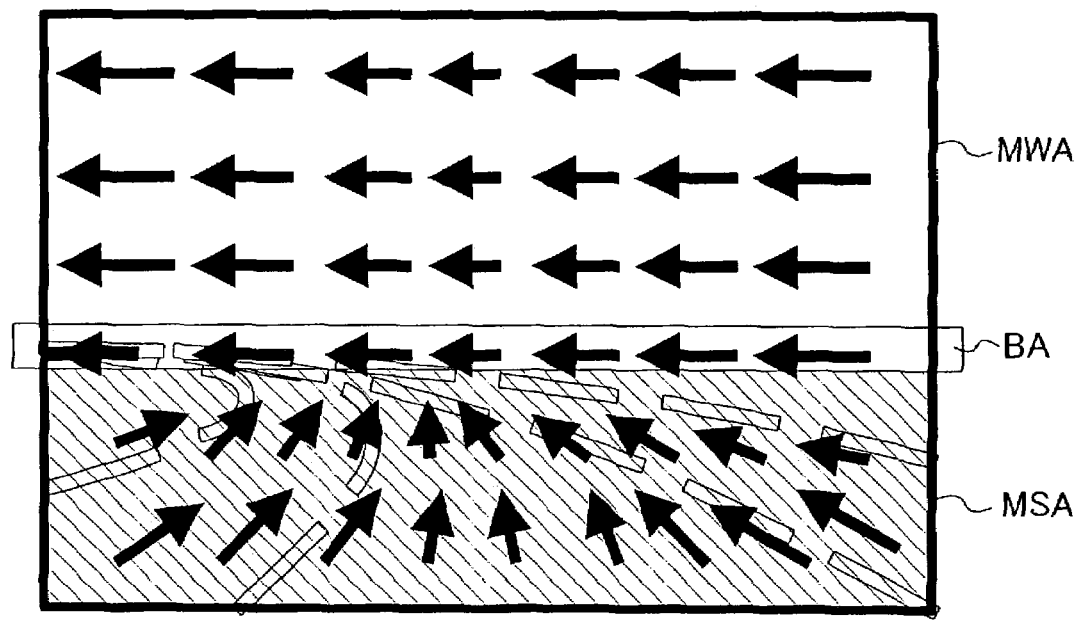

In use of a wall model as shown in FIG. 15, determination of the distance L to the wall model MW raises a problem. FIGS. 16A and 16B are views showing examples of background flows on a rightward curve, in which arrows indicate background flows determined and white lines indicate white lines on the road surface. MWA denotes a region in which background flows were determined using the wall model MS, and MSA denotes a region in which background flows were determined using the road surface model MS. FIG. 16A shows the results obtained when the distance L is sufficiently long and FIG. 16B shows the results obtained when the distance L is sufficiently short. By comparing FIGS. 16A and 16B with each other, how the background flows change with the magnitude of the distance L is observed.

That is, it is found that the magnitude of the background flows in the wall model region MWA is greatly different between FIGS. 16A and 16B. However, as described before, the condition that "part of an approaching object is in contact with the road surface" has been satisfied in the processing of approaching object detection. Therefore, background flows in the wall model region MWA are not necessarily required to be precise as long as background flows in the road surface model region MSA have been determined precisely.

Also found is that background flows in region BA neighboring the boundary between the road surface model and the wall model are considerably different between FIGS. 16A and 16B. The boundary region BA plays an important roll in the road surface determination. Therefore, the detection accuracy may possibly be degraded depending on the setting of the distance L to the wall model MW.

Figure 17:
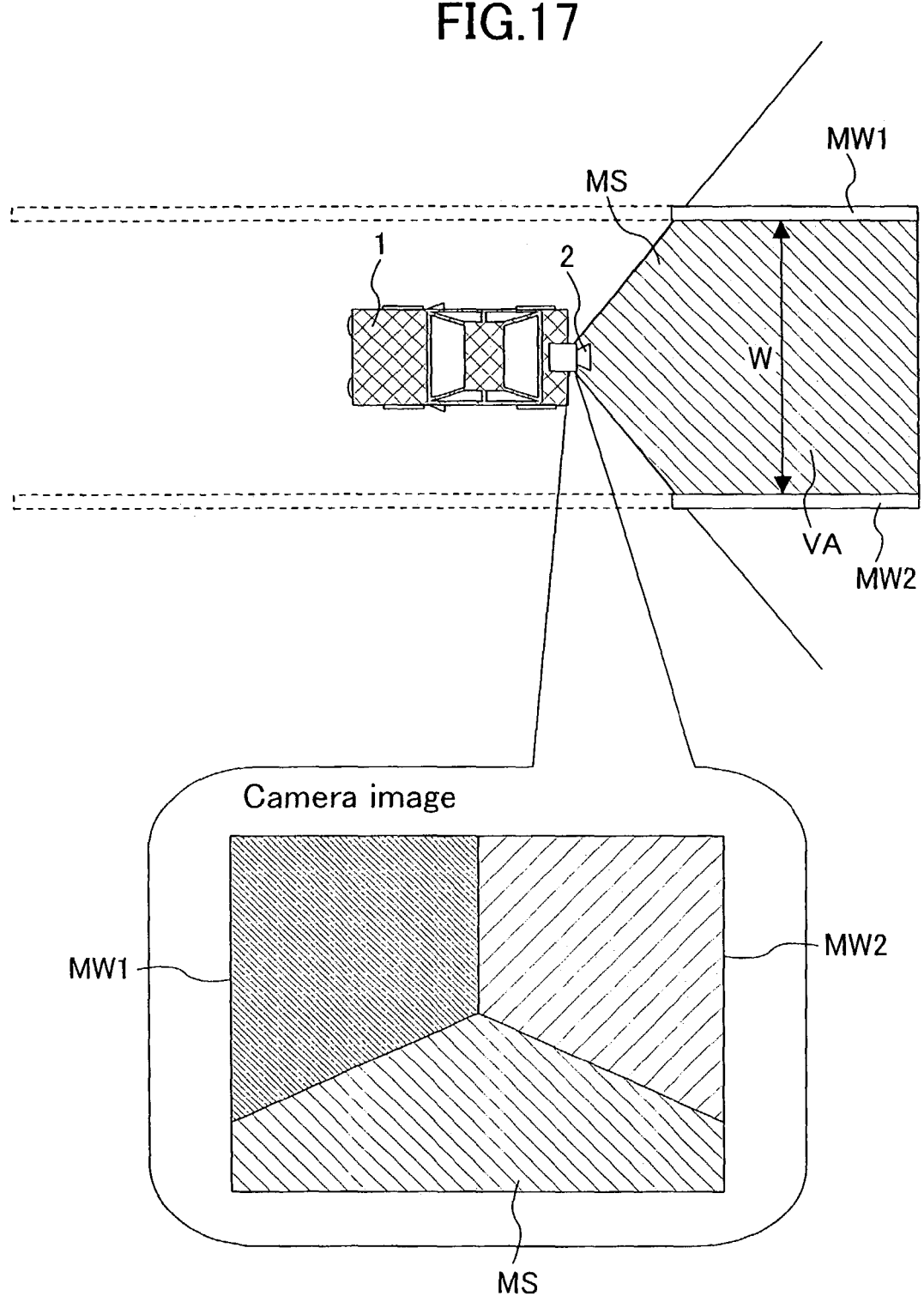
FIG. 17 is a view showing another example of a space model according to the present invention.

In view of the above, a space model having walls (MW1 and MW2) on both sides of the vehicle 1 as shown in FIG. 17 may be presumed as another wall model. This is like the vehicle running through a tunnel having an infinite height. The region of the coverage VA of the camera 2 existing between the left and right wall models MW1 and MW2 constitutes the region of the road surface model MS. Therefore, when the vehicle 1 is running straight ahead, the camera image taken with the camera 2 is composed of the left and right wall models MW1 and MW2 in the upper part and the road surface model MS in the lower part. In FIG. 17, the vehicle 1 is assumed running straight ahead for simplification of the description. When the vehicle 1 is running along a curve, the wall models may be curved to comply with the curvature of the curve.

Hereinafter, the case of expressing space models as shown in FIG. 17 in the form of transformation expressions from the camera image to the real world three-dimensional coordinate system will be described in detail.

First, the road surface model will be described. Assuming that the road surface on which the vehicle is running is a flat surface having no gradient, the road surface model constitutes Xw-Yw plane in the real world three-dimensional coordinate system. Therefore, by substituting the relational expression of this plane $$Zw=0$$

into expressions (1) and (2), a point (Xi, Yi) on the camera image can be transformed to real world three-dimensional coordinates Pw (Xw, Yw, Zw).

$$\begin{pmatrix} Xw \\ Yw \\ Zw \end{pmatrix} = \begin{pmatrix} -\dfrac{\left(\dfrac{Xi}{f}r_{11} - \dfrac{Yi}{f}r_{12} + r_{13}\right)t_z}{\dfrac{Xi}{f}r_{31} - \dfrac{Yi}{f}r_{32} + r_{33}} + t_x \\ -\dfrac{\left(\dfrac{Xi}{f}r_{21} - \dfrac{Yi}{f}r_{22} + r_{23}\right)t_z}{\dfrac{Xi}{f}r_{31} - \dfrac{Yi}{f}r_{32} + r_{33}} + t_y \\ 0 \end{pmatrix}, \quad Zc = \dfrac{-t_z}{\dfrac{Xi}{f}r_{31} - \dfrac{Yi}{f}r_{32} + r_{33}} \quad (8)$$

Expression (8) serves as the transformation expression for the road surface model from the image coordinate system to the real world three-dimensional coordinate system.

Next, the wall models will-be described. Assume that the vehicle 1 has turned with the turning radius R during the time period from time t−1 to time t. Note that the origin of the real world three-dimensional coordinate system is the center position between the rear wheels of the vehicle 1 at time t and that the rotation center is (R, 0, 0). Assume also that the turning radius R can be positive or negative, and specifically, is positive when the vehicle 1 turns counterclockwise and negative when the vehicle 1 turns clockwise.

Under the above assumption, in the real world three-dimensional system, the wall model constitutes part of a cylinder standing vertical to Xw-Zw plane and having a radius (R±W/2) in which the center of the section in Xw-Zw plane is the point (R, 0, 0). Therefore, the wall model is represented by the following expression.

$$(Xw-R)^2+Zw^2=(R\pm W/2)^2$$

Using this expression together with expressions (1) and (2), a point (Xi, Yi) on the camera image can be transformed to real world three-dimensional coordinates Pw (Xw, Yw, Zw) according to the following expression.

$$\begin{pmatrix} X_W \\ Y_W \\ Z_W \end{pmatrix} = \begin{pmatrix} aZc + t_x \\ bZc + t_y \\ cZc + t_z \end{pmatrix} \text{ where } a = \dfrac{Xi}{f}r_{11} - \dfrac{Yi}{f}r_{12} + r_{13}, \quad (9)$$

$$b = \dfrac{Xi}{f}r_{21} - \dfrac{Yi}{f}r_{22} + r_{23}, \quad c = \dfrac{Xi}{f}r_{31} - \dfrac{Yi}{f}r_{32} + r_{33},$$

$$Zc = \dfrac{a(R-t_x) - ct_z \pm \sqrt{\{a(t_x-R)+ct_z\}^2 - (a^2+c^2)\left\{t_x^2+t_z^2-\left(\dfrac{W}{2}\right)^2-2R\left(t_x+\dfrac{W}{2}\right)\right\}}}{(a^2+c^2)}$$

The position Pw (Xw, Yw, Zw) can be determined uniquely by adding further conditions that 1) an object appearing on the camera image does not exist behind the camera 2 (Zc>0) and 2) the space model is at a position higher than the road surface (Yw≧0). Expression (9) serves as the transformation expression for the wall model from the image coordinate system to the real world three-dimensional coordinate system.

Figure 18A:
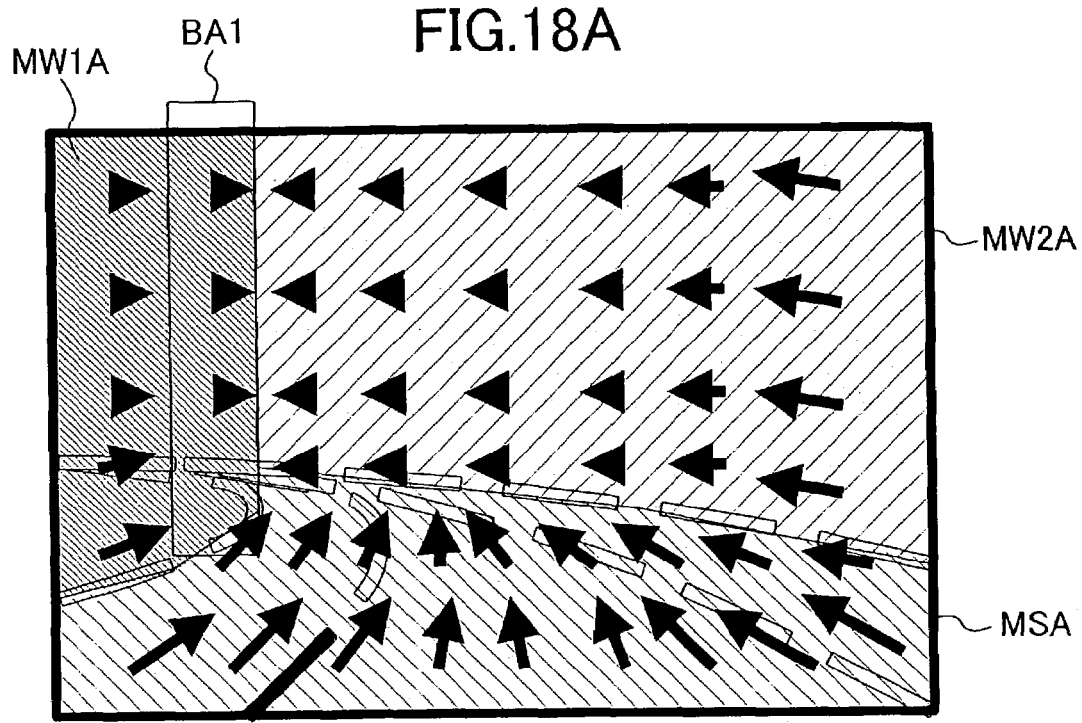
FIGS. 18A and 18B are views showing the relationship between the width W and background flows in the space model of FIG. 17.
Figure 18B:
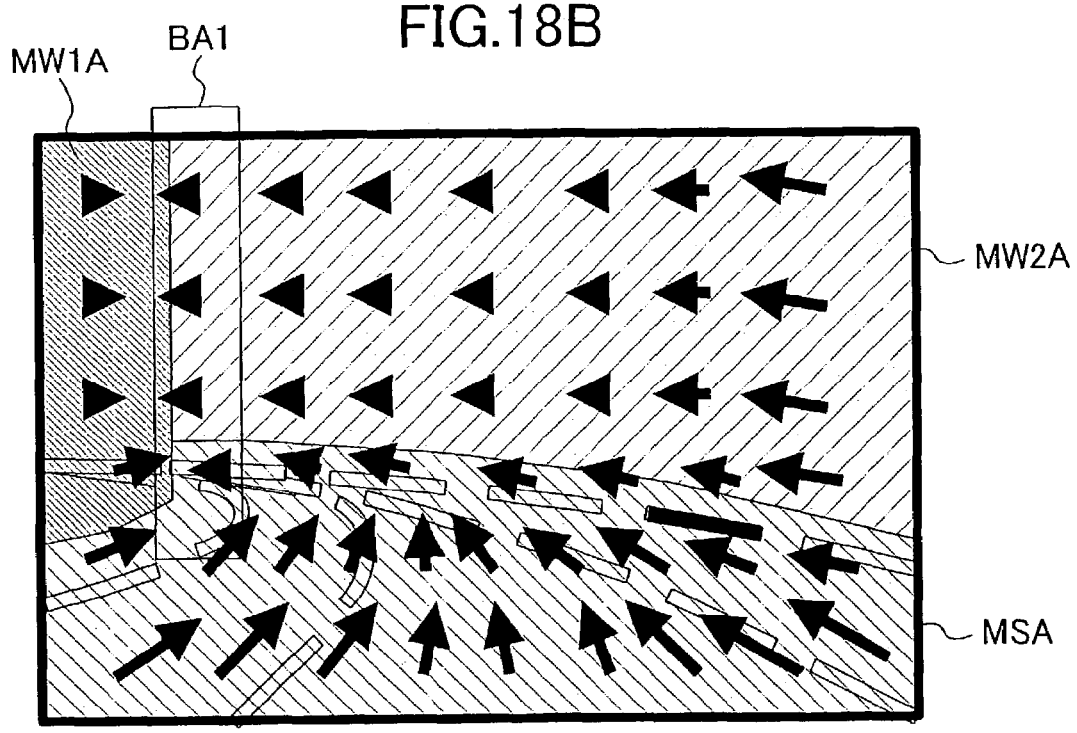

In use of a wall model as shown in FIG. 17, determination of the distance W between the walls MW1 and MW2 raises a problem. FIGS. 18A and 18B are views showing examples of background flows on a rightward curve, in which arrows indicate background flows determined and white lines indicate white lines on the road surface. MW1A denotes a region in which background flows were determined using the wall model MW1 on the left side as is viewed from the camera 2, MW2A denotes a region in which background flows were determined using the wall model MW2 on the right side as is viewed from the camera 2, and MSA denotes a region in which background flows were determined using the road surface model MS. FIG. 18A shows the results obtained when W is sufficiently small, and FIG. 18B shows the results obtained when W is sufficiently large. By comparing FIGS. 18A and 18B with each other, how the background flows change with the-magnitude of the distance W is observed.

That is, it is found that the background flows in region BA1 neighboring the boundary between the left and right wall models are greatly different between FIGS. 18A and 18B. However, as described before, the condition that "part of an approaching object is in contact with the road surface" has been satisfied in the processing of approaching object detection. Therefore, an error of background flows in the wall model regions MW1A and MW2A, if any, will not cause a large problem as long as background flows in the road surface model region MSA have been determined precisely.

That is, in wall models as shown in FIG. 17, unlike the model shown in FIG. 15 in which a wall is assumed in the rear from the camera, background flows in the boundary region between the wall models and the road surface model do not vary so greatly with the magnitude of the inter-wall distance W This enables accurate detection of an approaching object. For example, the inter-wall distance W may be set at about 10 m.

The inter-wall distance W can be measured with an obstacle sensor using laser, ultrasonic, infrared, millimeter wave or the like, or by binocular vision or a motion stereo method. Alternatively, texture information of the road surface may be used to extract a region other than the road surface from the camera image, and the extracted region may be assumed as a wall. Otherwise, only part of the space model may be measured with a range sensor, and the remaining part may be modeled using a plane or a curved surface as described above. The inter-wall distance W may be determined using the number of lanes of the road on which the vehicle is currently running determined from a camera image or via communication. For determination of the number of lanes from a camera image, white lines may be detected and the number of lanes may be determined from the detected number of white lanes, for example.

The shape of the space model may be switched based on GPS information and map data as in a car navigation system, time data from a clock and the like, operation data of wipers, headlights and the like of the vehicle and the like. For example, if it is found from GPS information and map data that the vehicle is currently running in a tunnel, a space model including a ceiling may be determined. Alternatively, information that the vehicle is currently running in a tunnel may be obtained via a communication means such as DSRC installed at the entrance of the tunnel. Otherwise, since the headlights are generally lit during running in a tunnel, it is determined, in association with time data, wiper data and headlight data, that the vehicle is running in a tunnel when the headlights are lit although it is neither nighttime (estimated from the time data) nor does it rain (estimated from the wiper data). Based on this determination, the space model may be switched.

Figure 19:
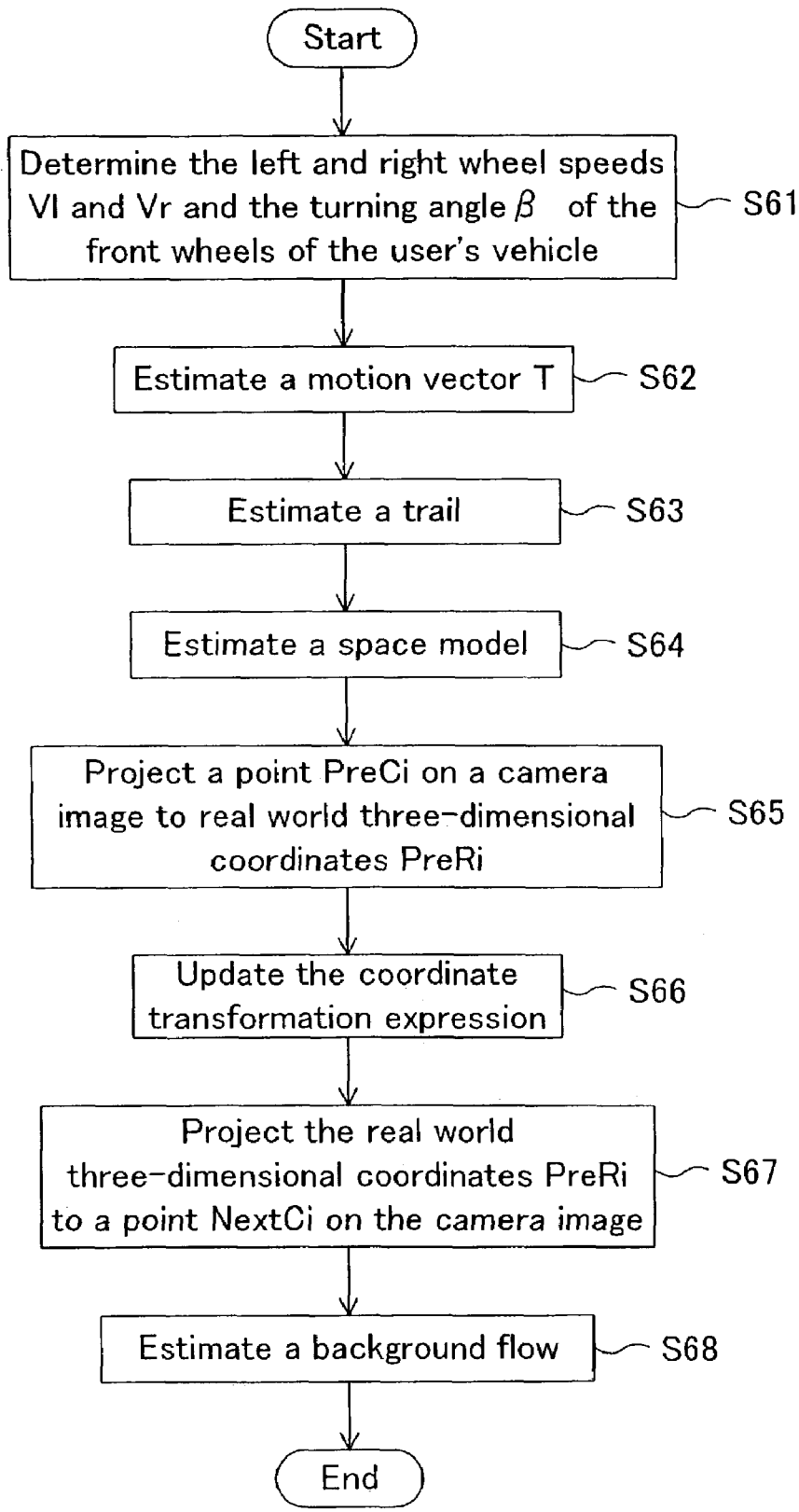
FIG. 19 is a flowchart showing a flow of processing of background flow estimation in Embodiment 2 of the present invention.

FIG. 19 is a flowchart showing the operation of the user's vehicle motion estimation section 13, the space model estimation section 14A and the background flow estimation section 15 of this embodiment. First, the left and right wheel speeds Vl and Vr and the turning angle β of the front wheels of the user's vehicle at time t are determined by measuring the rotation pulses of the left and right wheels and the steering angle of the steering wheel of the vehicle from time t−1 to time t (S61). Based on the thus-determined wheel speeds Vl and Vr and turning angle β and the known wheel base 1, the vehicle motion vector T is estimated using the Ackerman model described above according to expression (7) (S62).

Figure 20:
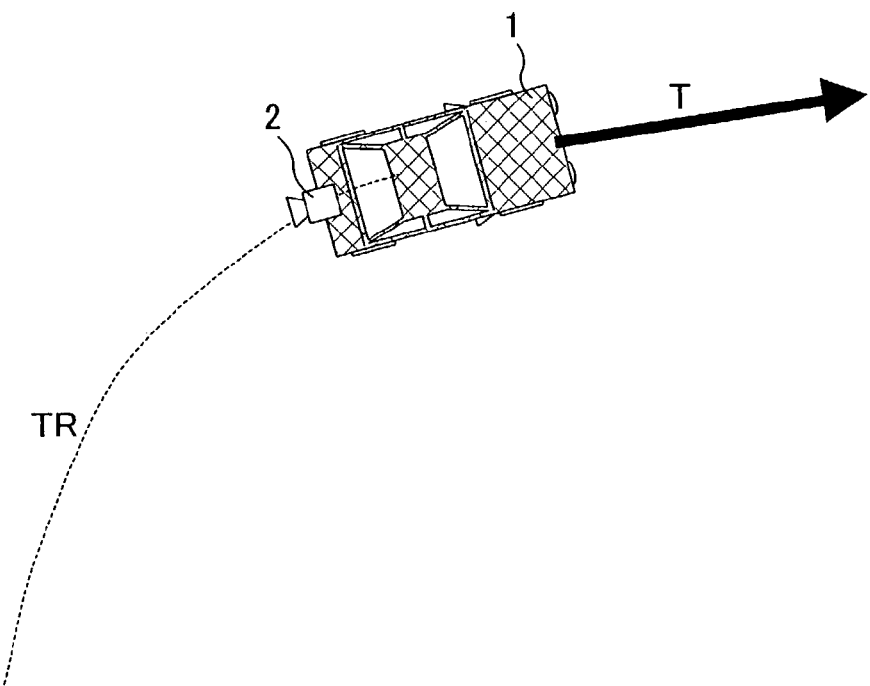
FIG. 20 is a view demonstrating how to estimate a background flow in Embodiment 2 of the present invention.

The motion vectors at respective times before time t−1 must have been obtained. By connecting these motion vectors, the trail of the user's vehicle until time t−1 is determined (S63). FIG. 20 shows an example of the trail of the user's vehicle until time t−1 determined in this manner, in which T denotes the current motion vector and TR denotes the trail determined by connecting the preceding motion vectors.

Figure 21:
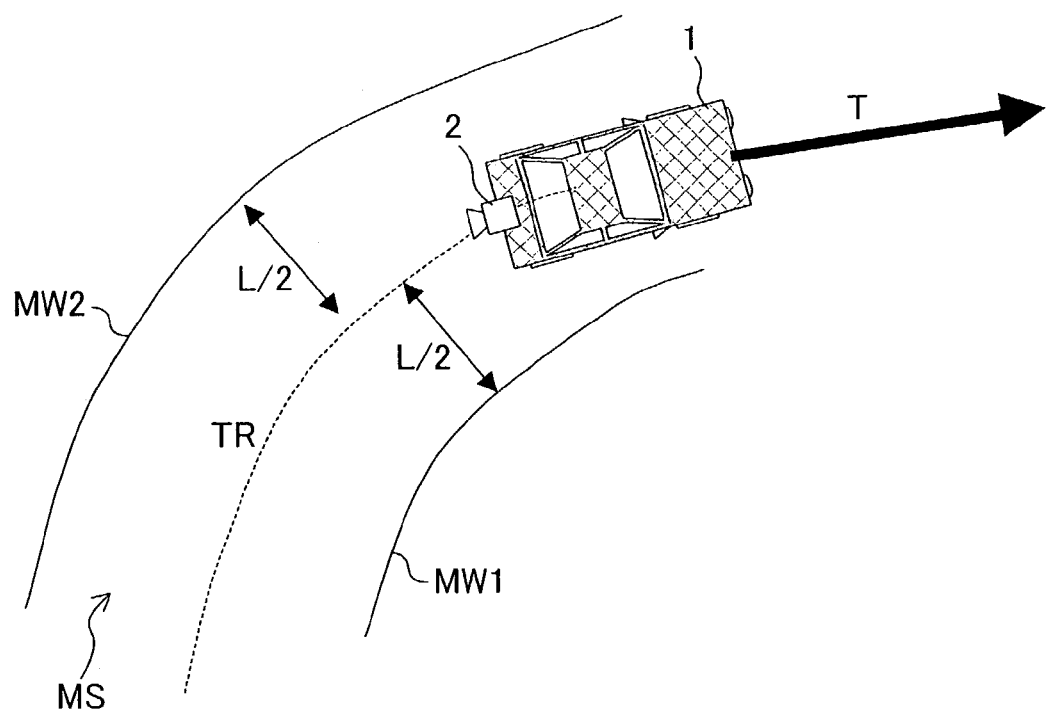
FIG. 21 is another view demonstrating how to estimate a background flow in Embodiment 2 of the present invention.

Thereafter, a space model is estimated (S64). Assume herein that a road surface model and wall models as described above with reference to FIG. 17 are used. That is, as shown in FIG. 21, a plane including the trail TR is determined as the road surface model MS, and walls normal to the road surface model MS at positions apart from the trail TR by length W/2 leftward and rightward are determined as the wall models MW1 and MW2.

Figure 22:
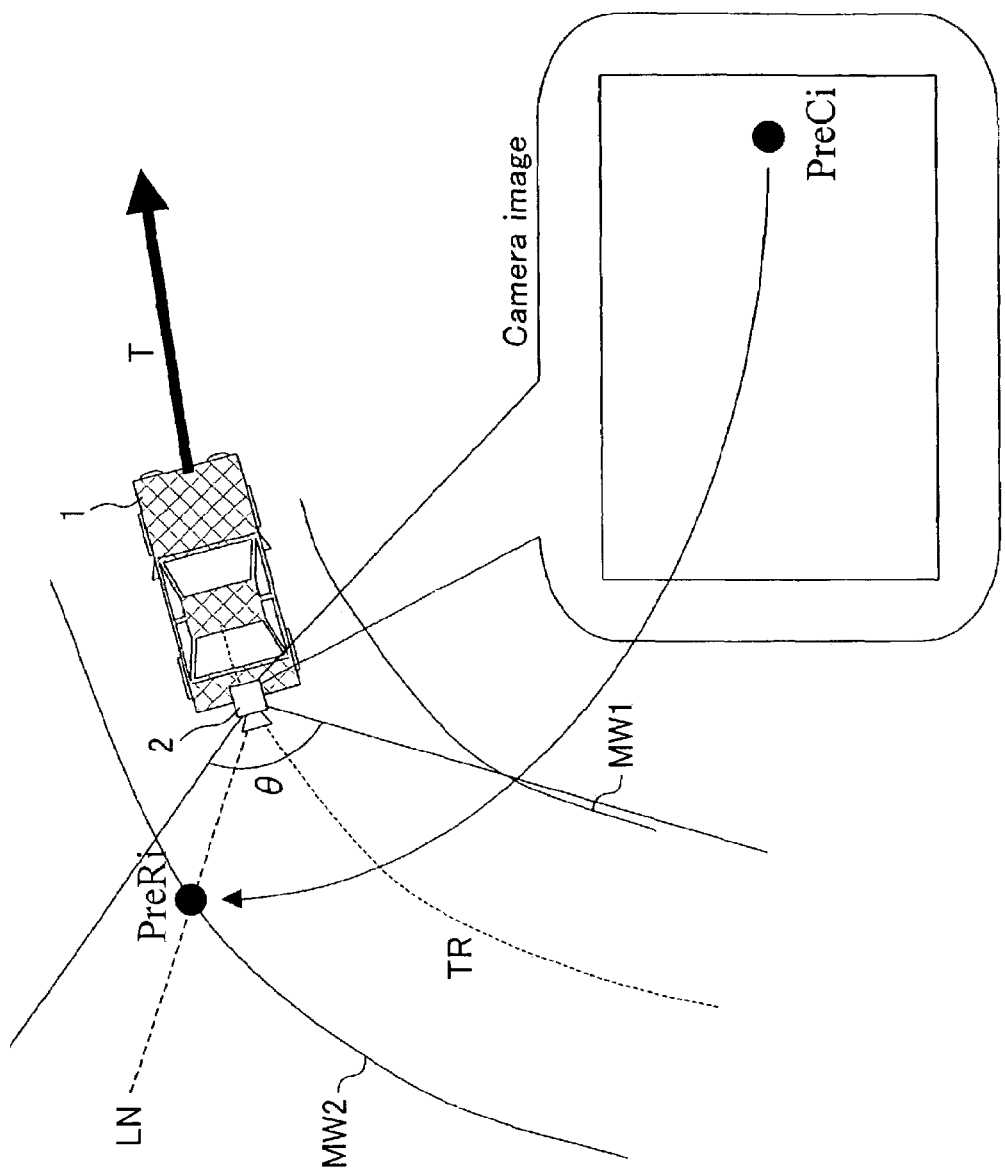
FIG. 22 is yet another view demonstrating how to estimate a background flow in Embodiment 2 of the present invention.

Background flows are then estimated (S65 to S68). First, an arbitrary point PreCi (PreXi, PreYi) on a camera image taken at time t−1 is projected to real world three-dimensional coordinates PreRi (PreXw, PreYw, PreZw) (S65). FIG. 22 is a view demonstrating this processing, in which the angle θ is the angle of view of the camera 2. As described before, with only the perspective projection transformation represented by expressions (1) and (2), the point PreCi on the camera image cannot be projected to a point in the real world coordinate system, but it is only found that the point PreCi corresponds to a straight line passing through the focal point of the camera 2. However, by assuming that the vehicle 1 is running in an estimated space model, the point PreRi can be determined as the intersection point between the straight line LN and the space model (MW2 in FIG. 22).

Figure 23:
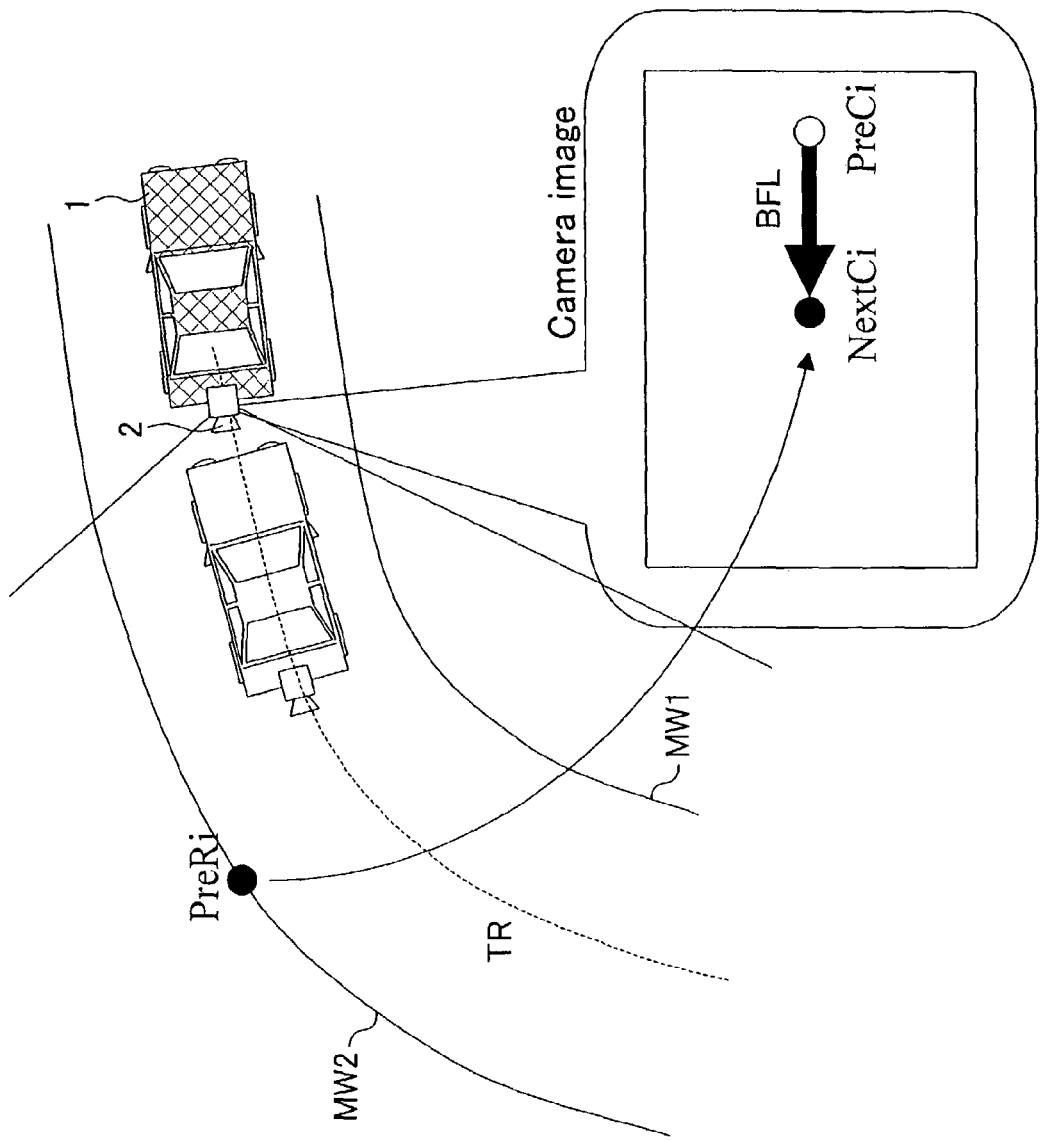
FIG. 23 is yet another view demonstrating how to estimate a background flow in Embodiment 2 of the present invention.

Thereafter, the position of the vehicle 1 at time t is determined by moving the vehicle 1 by the current motion vector T, and the parameters of the coordinate transformation expression (expression (2)) are updated to conform to the new position (S66). It is then computed at which position the real world coordinate point PreRi is located on the camera image at the new camera position (S67). This transformation from the real world coordinates to the camera image is realized using expression (1) and the updated expression (2). The thus-determined point on the camera image is NextCi (NextXi, NextYi). FIG. 23 is a view diagrammatically illustrating this processing.

The point NextCi (NextXi, NextYi) determined in the manner described above indicates the position of the point PreRi on the camera image at time t under the assumption that the point PreRi has not moved from time t−1 until time t, that is, the point PreRi is a point on a background object. Therefore, a background flow BFL determined when the point PreCi on the camera image at time t−1 is assumed as part of a background can be expressed as (NextXi-PreXi, NextYi-PreYi) (S68). By performing this processing for all points on the camera image, background flows as shown in FIG. 13 can be obtained.

Figure 24:
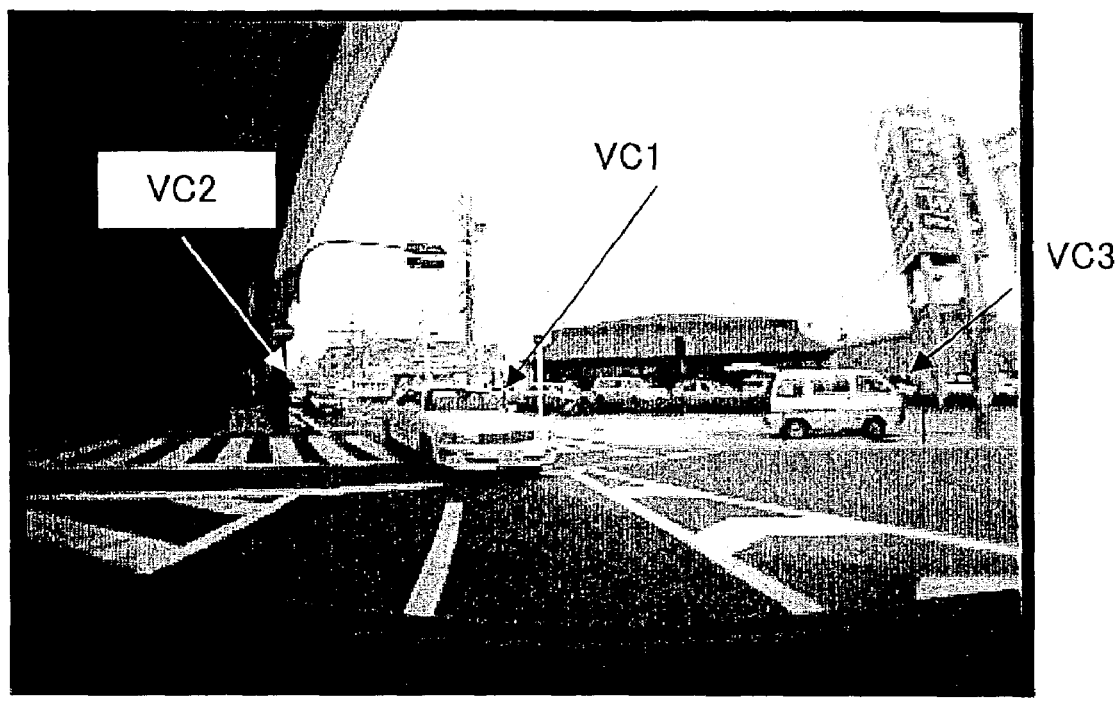
FIG. 24 is an example of an image taken with a camera mounted on a vehicle.

An example of the approaching object detection in this embodiment will be described with reference to FIGS. 24, 25A, 25B, 26A and 26B. FIG. 24 shows an image taken with a camera mounted in the rear of a vehicle. The vehicle is about to make a right turn, and a white passenger car VC1 is approaching from the rear. Note that passenger cars VC2 and VC3 are at a halt and the white passenger car VC1 is the only moving object on this image.

Figure 25A:
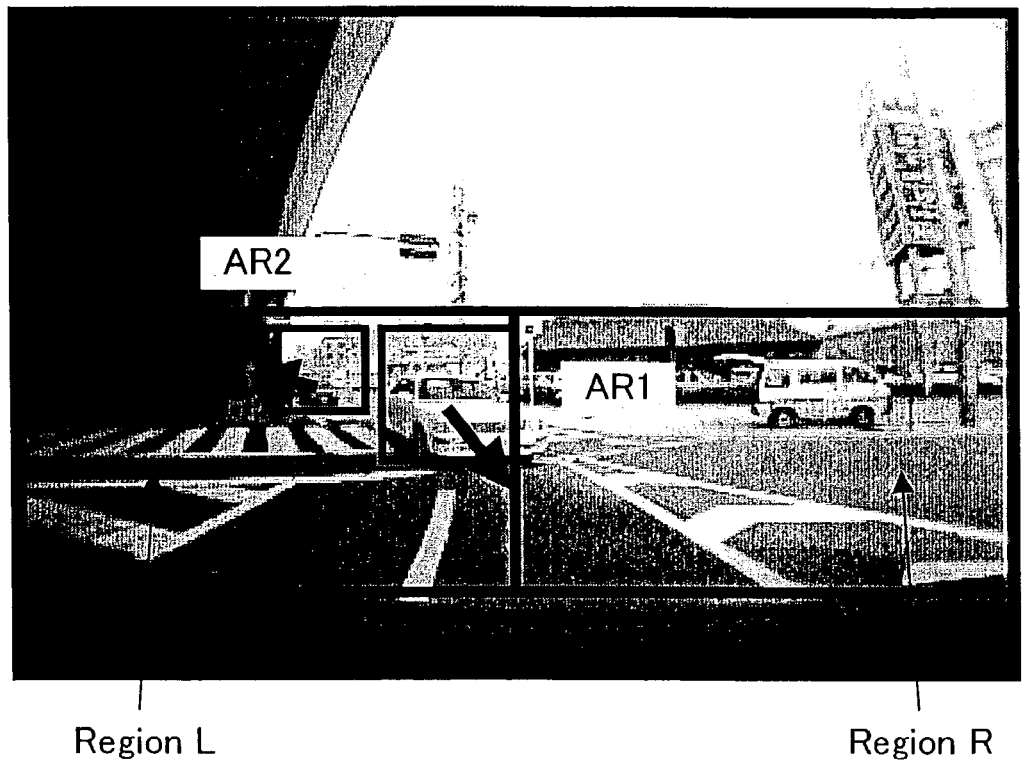
FIGS. 25A and 25B are views showing the results of detection of approaching objects from the camera image of FIG. 24 according to the first related art.

According to the first related art described before, horizontally divided region L and region R are first given as shown in FIG. 25A. Among detected optical flows, one pointing leftward or lower leftward is detected as an approaching object in the region L, while one pointing rightward or lower rightward is detected as an approaching object in the region R.

Figure 25B:
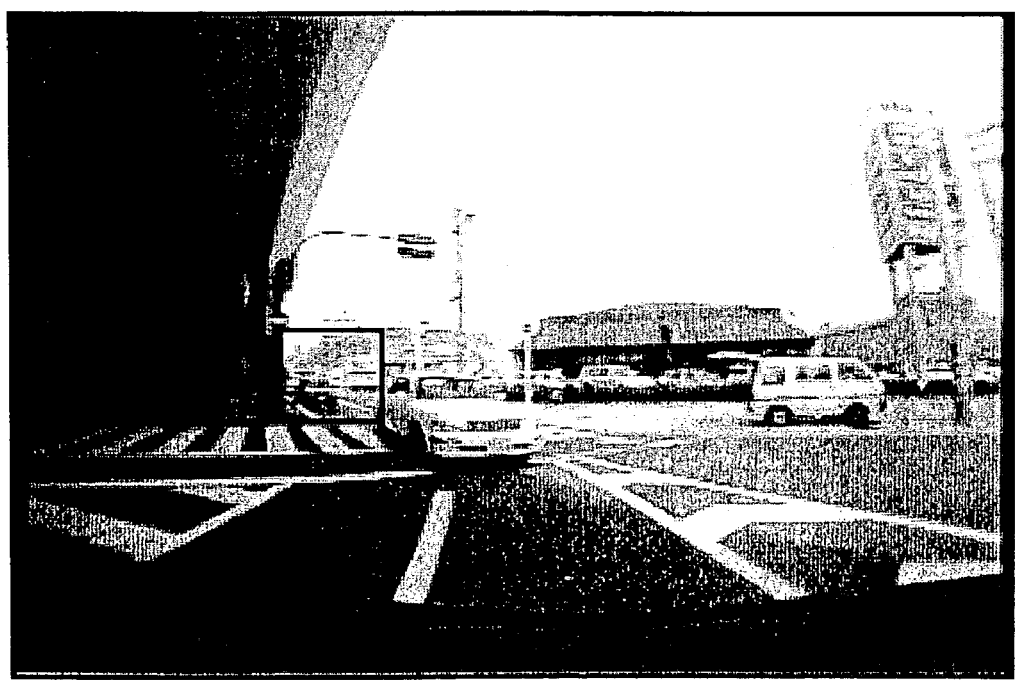

The first related art assumes range AR1, which includes the passenger car VC1 that is an approaching object, and range AR2, which includes the passenger car VC2 that is at a halt. The passenger car VC1 in the range AR1 however fails to be detected as an approaching object because it has an optical flow pointing lower rightward as indicated by the arrow. On the contrary, the passenger car VC2 in the range AR2 is mistakenly detected as an approaching object. The reason is that since the user's vehicle is running along a curve, an optical flow pointing leftward as indicated by the arrow is given to the passenger car VC2. FIG. 25B shows the results of the processing described above, in which the range detected as an approaching object is framed. Thus, in the first related art, detection of an approaching object fails during curve running.

In this embodiment, background flows in the ranges AR1 and AR2 are determined as shown by the arrows in FIG. 26A. That is, in the range AR1 including the passenger car VC1 as an approaching object, while the optical flow points lower rightward as shown in FIG. 25A, the background flow points leftward as shown in FIG. 26A, which is completely different from the optical flow From this, the range AR1 is recognized as an approaching object. In the range AR2 including the passenger car VC2 at a halt, while the optical flow points leftward as shown in FIG. 25A, the background flow also points leftward as shown in FIG. 26A, which is very similar to the optical flow From this, the range AR2 is recognized as a background, not an approaching object. FIG. 26B shows the results of the processing described above, in which the range detected as an approaching object is framed. In this way, according to the present invention, unlike the prior art, an approaching object can be detected without fail even during curve running.

A monitoring device for vehicles using a road surface model is described in Japanese Laid-Open Patent Publications No. 2000-74645 and No. 2001-266160. However, the techniques described in these publications neither use the road surface model for determination of background flows, nor have an object of detecting an approaching object during curve running. These disclosures are therefore different in the problem to be overcome from the present invention.

To state specifically, in the former publication, optical flows generated from vehicles existing within a monitoring range are first detected, and using the detected optical flows, the correlation between the user's vehicle and the neighboring vehicles is monitored. A feature of this technique is limiting the range for detection of optical flows to shorten the processing time, and for this purpose, a road surface model is used. In other words, the space model is not used for detection of an approaching object flow unlike the present invention. Actually, this technique employs a method using virtual FOE disclosed in the aforementioned fifth related art for detection of an approaching object flow during curve running, and thus has the same problem as that arising in the fifth related art. That is, precise detection of an approaching object is unavailable on a curve having no white line.

The latter publication uses three-dimensional motion of each point on a screen. Specifically, for each point on a screen, an optical flow as two-dimensional motion on the screen is first determined. Based on the determined optical flow and vehicle motion information, three-dimensional motion of each point in the real world is computed. The three-dimensional motion is traced with time, to thereby estimate a space model for the space in which the vehicle is actually running. In the thus-estimated space model, an object different in motion from the road surface is detected as an obstacle. This technique, in which the motion of each point is determined completely three-dimensionally, has a problem that computation cost is very high, and thus finds difficulty in implementation.

EXAMPLE OF HARDWARE CONFIGURATION

Figure 27:
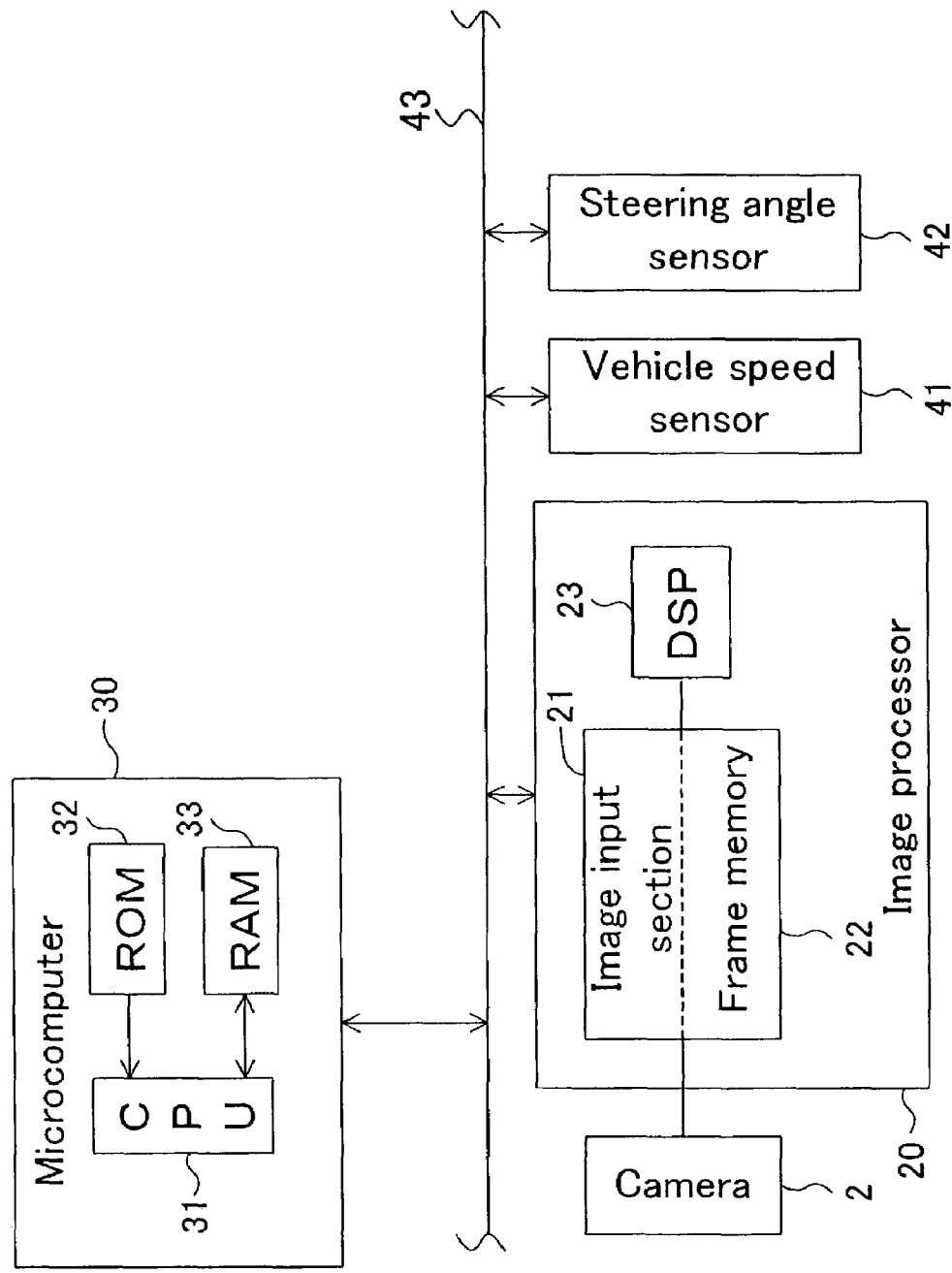
FIG. 27 is a view of an example of a hardware configuration according to the present invention.

FIG. 27 is a view showing an example of hardware configuration for implementing the present invention. Referring to FIG. 27, in an image processor 20, an image taken with a camera 2 mounted in the rear of a vehicle, for example, is converted to a digital signal by an image input section 21 and stored in a frame memory 22. A DSP 23 detects an optical flow from the digitized image signal stored in the frame memory 22. The detected optical flow is sent to a microcomputer 30 via a bus 43. A vehicle speed sensor 41 measures the travel speed of the vehicle, and a steering angle sensor 42 measures the steering angle of the vehicle. Signals representing the measurement results are sent to the microcomputer 30 via the bus 43.

The microcomputer 30 includes a CPU 31, a ROM 32 storing a predetermined program for control, and a RAM 33 storing computation results from the CPU 31, and determines whether or not an approaching object exists in an image taken with the camera 2.

Specifically, the CPU 31 first estimates the motion of the vehicle from the travel speed signal and the steering angle signal sent from the vehicle speed sensor 41 and the steering angle sensor 42. The CPU 32 then estimates a trail of the running of the vehicle based on the estimated motion of the vehicle. That is, the CPU 32 connects the estimated motion of the vehicle with past trail information stored in the RAM 33, to obtain a trail until the current time. This new trail information is stored in the RAM 33.

The CPU 31 then estimates a space model using the trail information stored in the RAM 33, and determines a background flow. The determined background flow is compared with an optical flow supplied from the image processor 20, to detect an approaching object flow and thereby detect an approaching object.

EMBODIMENT 3

Figure 28:
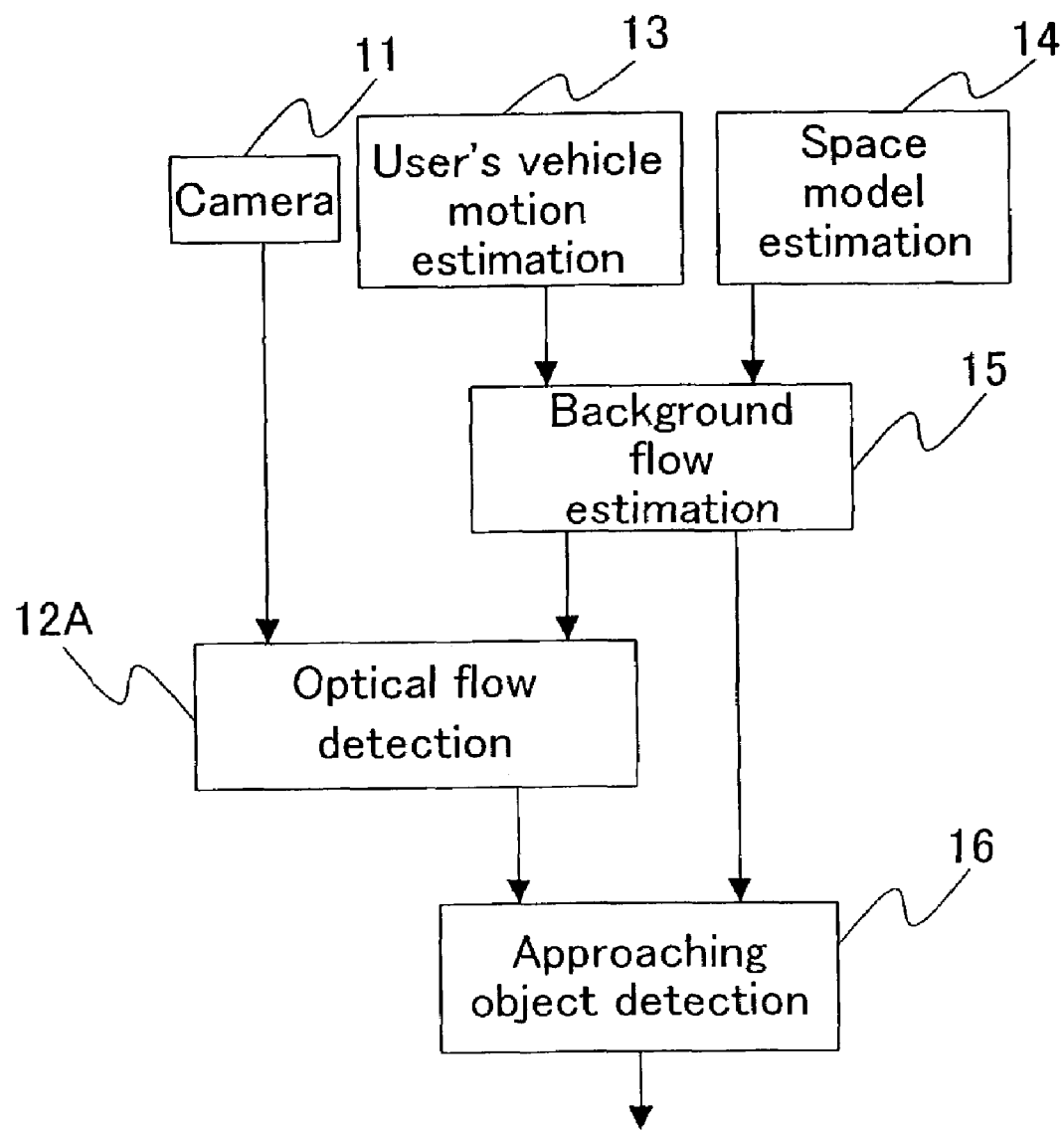
FIG. 28 is a block diagram of a monitoring device of Embodiment 3 of the present invention.

FIG. 28 is a block diagram conceptually showing the basic configuration of a monitoring device for vehicles of Embodiment 3 of the present invention. In FIG. 28, the same components as those in FIG. 1 are denoted by the same reference numerals, and the description thereof is omitted here. This embodiment is different from Embodiment 1 in that an optical flow detection section 12A detects an optical flow using a background flow estimated by the background flow estimation section 15. This contributes to reducing the computation time of an optical flow and improving the detection accuracy.

An optical flow Vi, which is the motion of an object on a camera image, is expressed by the sum of motion Vb representing the actual motion of the object and relative motion Vc caused by the motion of the camera itself.

$$Vi = Vb + Vc$$

If the object is immobile, that is, the object is a background, Vb is 0 and Vc is equal to a background flow. If the object is a moving object, Vb depends on the motion vector of the object, and Vc is nearly equal to a background flow. From this, it is found that when the travel amount of an object is not so large, the optical flow for this object exists in the vicinity of the background flow. Therefore, during the determination of the optical flow, the search can be limited to the vicinity of the background flow. This can narrow the search range and thus reduce the computation time.

The method of this embodiment can also improve the accuracy of detection of an optical flow. This is especially effective when hierarchical images are used for optical flow detection. Hierarchical images are used for reduction in computation time as described before. However, since the resolution of the image becomes lower as the hierarchical level is higher, the possibility that an error may arise in template matching is high. If an error arises in a high hierarchical level and erroneous detection occurs, the error fails to be absorbed in a lower hierarchical level, resulting in detection of an optical flow different from the actual one.

Figure 29:
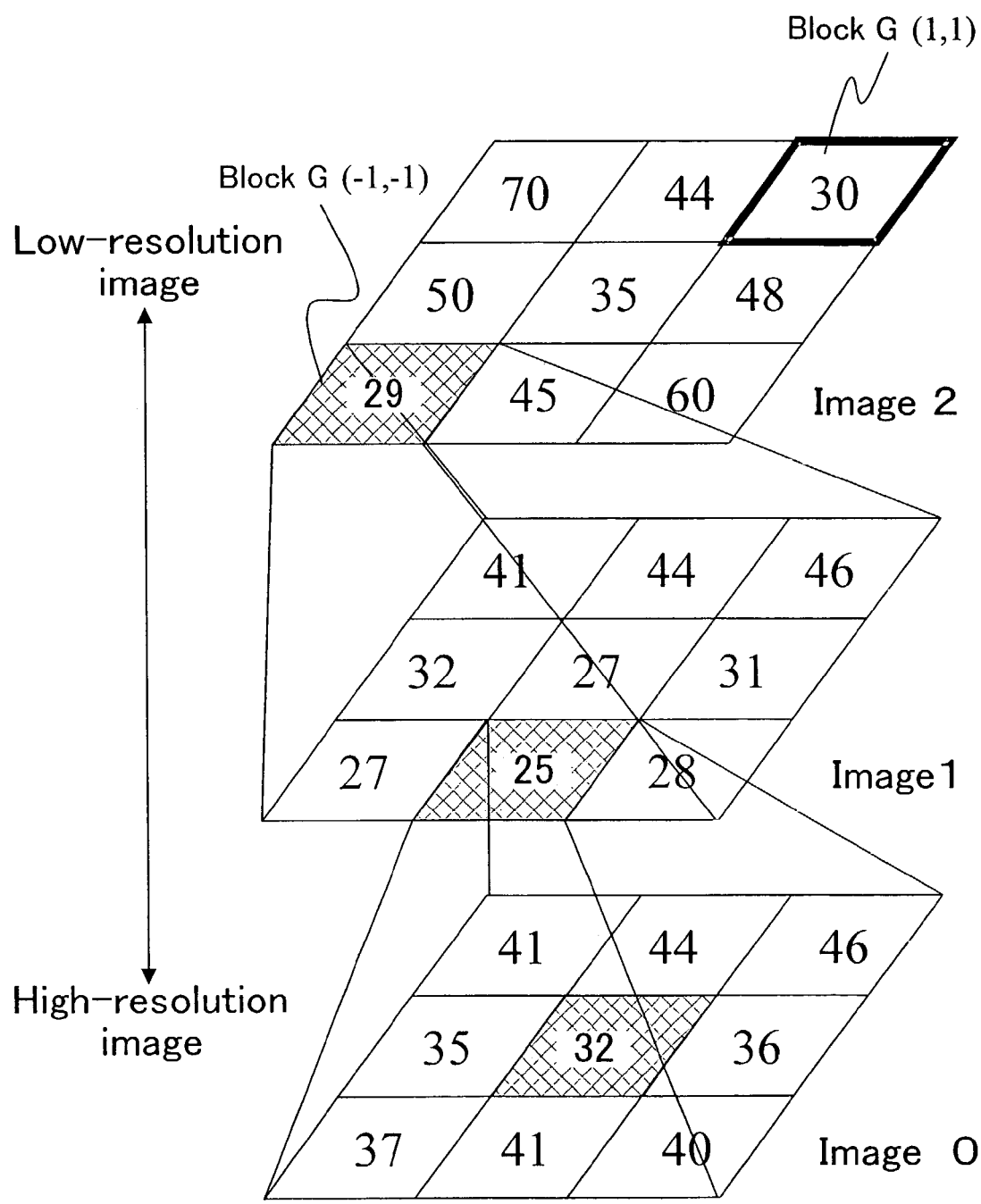
FIG. 29 is a conceptual view demonstrating a problem in hierarchical images.

FIG. 29 is a view diagrammatically showing the results of block matching in hierarchical images. In FIG. 29, image 1 was obtained by scaling down image 0, which is an original image, and executing LPF, and image 2 was obtained by further scaling down the image 1 and executing LPF. Respective rectangles in the images represent blocks subjected to matching. The figure in each rectangle indicates a value of differential evaluation function between a block G in question and a template block F. That is, assuming that the size of the blocks is m×n, the brightness of each pixel in the template block F is f (i, j), and the brightness of each pixel in the block G in question is g (x, y, i, j), a differential evaluation function E (x, y) is represented by expression (10) or (11).

$$E(x, y) = \sum_{i=1}^{m}\sum_{j=1}^{n} |g(x, y, i, j) - f(i, j)| \qquad (10)$$

$$E(x, y) = \sum_{i=1}^{m}\sum_{j=1}^{n} (g(x, y, i, j) - f(i, j))^2 \qquad (11)$$

That is, a block having the minimum value of differential evaluation function E (x, y) is recognized as the block corresponding to the template block F, and corresponds to the optical flow in the image.

The block matching is first performed for the image 2 having the lowest resolution. Assume that the template block F is currently moving upper rightward on the image. Theoretically, matching with block G (1, −1) should be highest and the differential evaluation function E (1, −1) should be minimum. In this case, however, consider that block E (−1, 1) happens to be minimum as shown in FIG. 29 due to reduction in resolution caused by hierarchical arrangement, texture, aperture and the like. In this event, a block corresponding to block G (−1, 1) in the image 2 is set as the research region in the image 1. Further, a block corresponding to a block having the minimum differential evaluation function value in the research region is set as the research region in the image 0. However, since no block corresponding to a correct optical flow exists in the resultant research region, an erroneous optical flow will be detected.

In this embodiment, the problem described above is overcome by adding a block in the vicinity of a background flow to the research region during the block matching for the original image 0 having the highest resolution. As described above, an optical flow will exist in the vicinity of a background flow with high possibility. In addition, in the approaching object flow detection, the difference between an optical flow and a background flow is important. To state differently, an object in which no optical flow exists in the vicinity of a background flow is a moving object. Thus, whether or not an optical flow is a background can be recognized by including the vicinity of a background flow in the research region. For example, when a block having the minimum differential evaluation function value exists in the vicinity of a background flow, the optical flow related to this block is a background. On the contrary, when a block having a differential evaluation function value smaller than that in the vicinity of a background flow exists in a region other than the vicinity of the background flow, the optical flow related to this block can be recognized as a moving object.

EMBODIMENT 4

Figure 30:
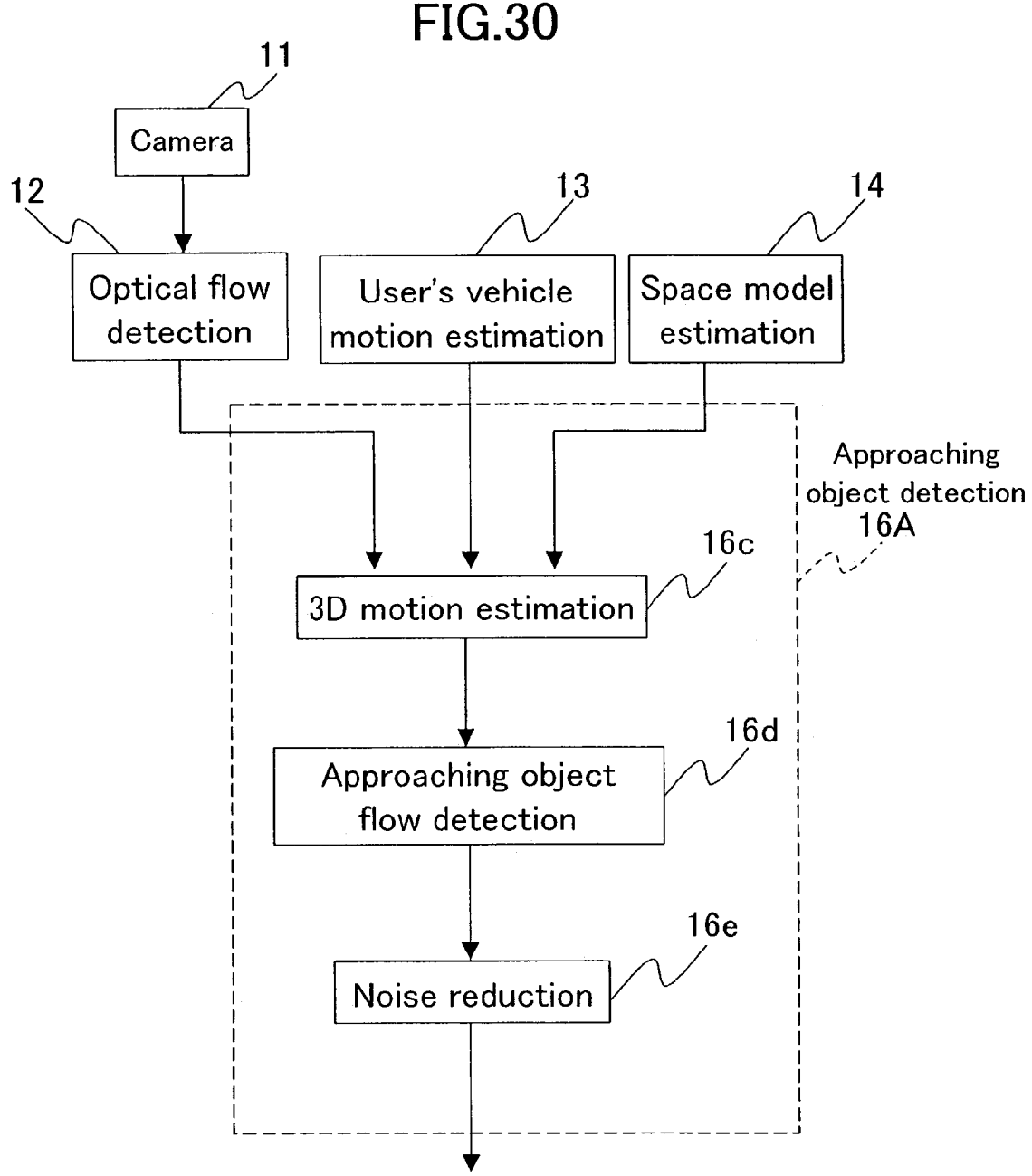
FIG. 30 is a block diagram of a monitoring device of Embodiment 4 of the present invention.

FIG. 30 is a block diagram conceptually showing the basic configuration of a monitoring device for vehicles of Embodiment 4 of the present invention. In FIG. 30, the same components as those in FIG. 1 are denoted by the same reference numerals, and the description thereof is omitted here. This embodiment is different from Embodiment 1 in that the background flow estimation section 15 is omitted and an approaching object detection section 16A detects an approaching object by estimating spatial motion of an object. In the approaching object detection section 16A, a three-dimensional motion estimation portion 16c estimates spatial motion of an object, not two-dimensional motion as an optical flow, using the optical flow Vi actually determined from a camera image by the optical flow detection section 12, the motion vector T of the user's vehicle determined by the user's vehicle motion estimation section 13 and the space model estimated by the space model estimation section 14.

Figure 31:
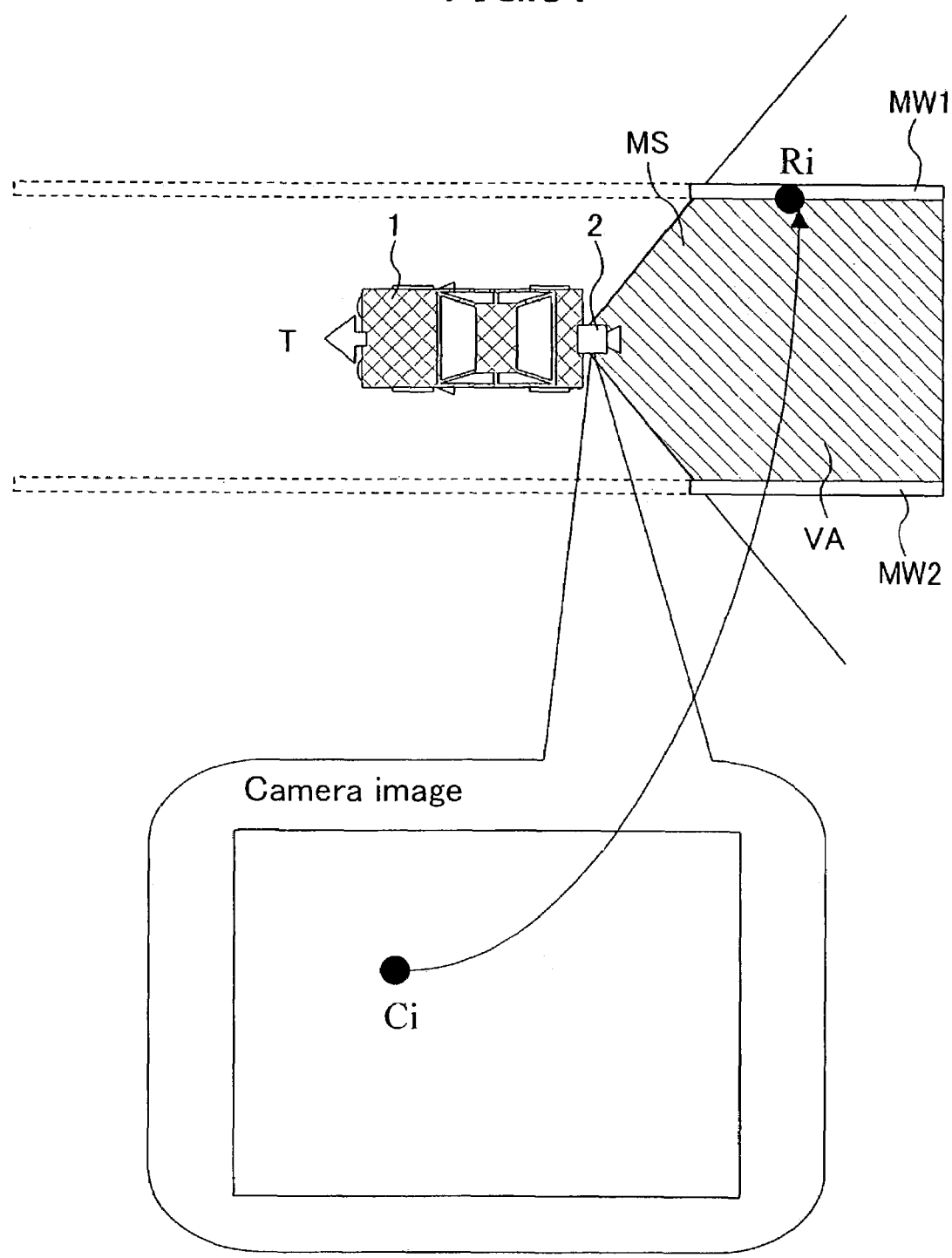
FIG. 31 is a view demonstrating processing in Embodiment 4 of the present invention.
Figure 32:
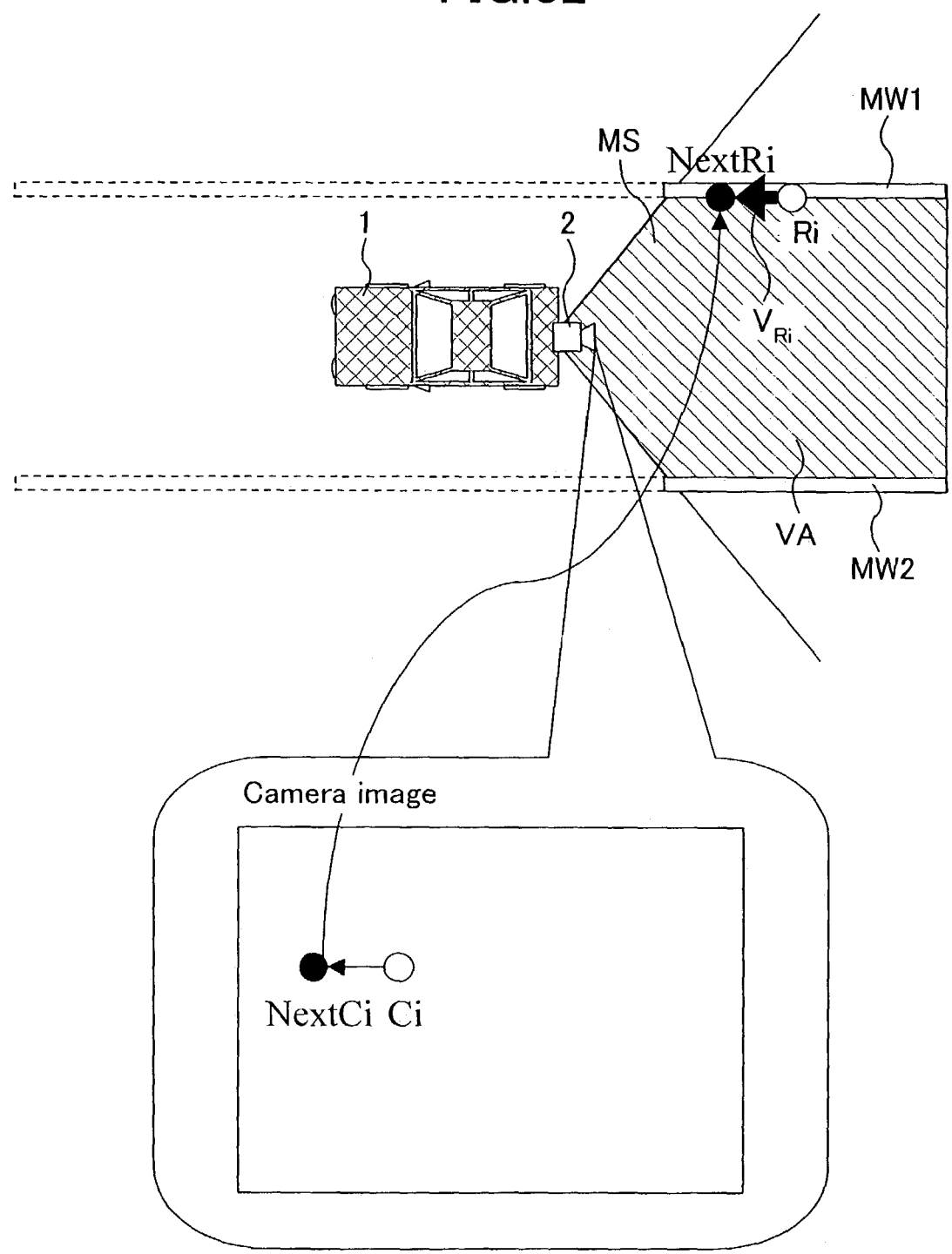
FIG. 32 is another view demonstrating the processing in Embodiment 4 of the present invention.

Referring to FIGS. 31 and 32, processing by the three-dimensional motion estimation portion 16c will be described. FIG. 31 is a view diagrammatically showing the relationship between a vehicle 1 and a space model at time t−1, in which space models MS, MR1 and MR2 as shown in FIG. 17 are presumed. Note that these space models are expressed in the real world three-dimensional coordinate system. A camera image taken with a camera 2 is also shown in FIG. 31. As described before, a point Ri in the real world three-dimensional coordinate system corresponding to an arbitrary point Ci on the camera image can be determined by projection using the perspective projection transformation expression (expressions (1) and (2)) and the space models MS, MR1 and MW2. T denotes the motion vector of the vehicle 1 from time t−1 until time t determined by the user's vehicle motion estimation section 13.

FIG. 32 is a view diagrammatically showing the relationship between the vehicle 1 and the space model at time t. In general, the space model changes with time. Assume that the optical flow detection section 12 finds that the point Ci at time t−1 corresponds to a point NextCi at time t. As in the case of the point Ri corresponding to the point Ci described above, a point NextRi in the real world three-dimensional coordinate system corresponding to the point NextCi at time t can also be determined by projection. Therefore, a vector $V_{Ri}$ indicating the motion of the point Ri until time t can be determined by the following expression.

$$V_{Ri} = \text{NextRi} - \text{Ri}$$

The motion of the vehicle 1 from time t−1 until time t has been determined as the vector T. Therefore, by determining a vector ($V_{Ri}$−T), it is possible to determine the motion of the point Ci on the camera image in the real world three-dimensional coordinate system, that is, a space flow. By performing this processing for all points on the camera image, the respective motions of all the points on the camera image in the real world three-dimensional coordinate system can be determined.

Naturally, the space model may be obtained with various sensors and via communication as in Embodiment 1, or other space models may be used.

Based on the motion of each point on the camera image in the real world three-dimensional coordinate system, that is, a space flow, the three-dimensional motion estimation portion 16c determines whether or not the point is approaching the user's vehicle. Specifically, it is determined that the point Ci is an approaching object flow when the vector ($V_{Ri}$-T) points toward the user's vehicle, and otherwise determined that the point Ci is not an approaching object flow.

Thereafter, the noise reduction portion 16e performs the same processing as that performed by the noise reduction portion 16b in Embodiment 1, to detect an approaching object.

In the above description, it was assumed that the space model was expressed in the real world three-dimensional coordinate system. Alternatively, the space model may be expressed in the camera coordinate system. In this case, the points Ci and NextCi on the camera image respectively correspond to points Ri and NextRi in the camera coordinate system. The origin of the camera coordinate system has moved by an amount corresponding to the motion vector T of the vehicle 1 during the time period from time t−1 until time t. Therefore, the motion $V_{Ri}$ of the point Ci on the camera image can be determined by the following expression.

$$V_{Ri} = NextRi - Ri - T$$

It is determined that the point Ci is an approaching object flow when the vector $V_{Ri}$ points toward the origin, and otherwise determined that the point Ci is not an approaching object flow. By performing this processing for all points on the camera image and subjecting the results to noise reduction by the noise reduction portion 16e, an approaching object can be detected.

<Use in Combination with Obstacle Sensor>

According to the present invention, an approaching object is detected by use of image information. This enables complicate detection such as whether or not an approaching object is coming closer or going away, unlike the detection with an obstacle sensor using laser, infrared, millimeter wave and the like. However, if an obstacle is near the user's vehicle, it is important to just detect the simple information of whether or not an obstacle exists precisely and promptly, rather than the complicate information mentioned above.

In view of the above, the obstacle detection may be performed with an obstacle sensor for a region near the user's vehicle, while being performed employing the method according to the present invention for the remaining wide region. This permits high-speed, precise monitoring of the surroundings of the vehicle.

Figure 33A:
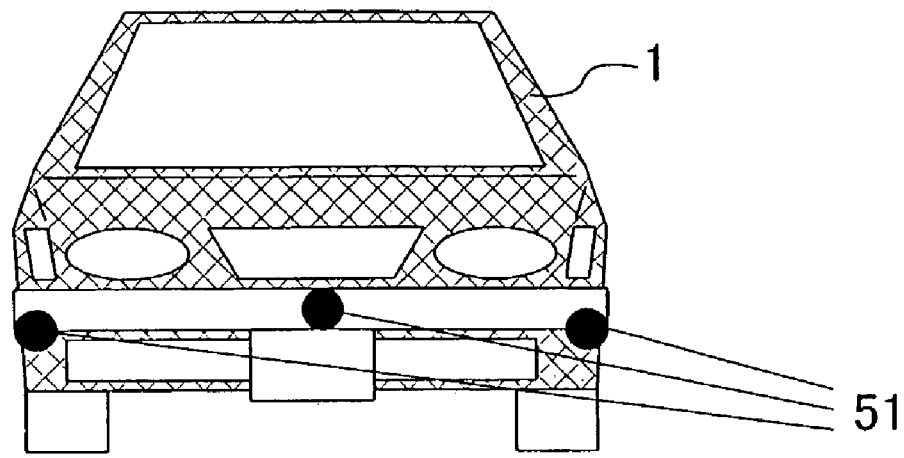
FIGS. 33A and 33B are views showing examples of placement of obstacle sensors according to the present invention.
Figure 33B:
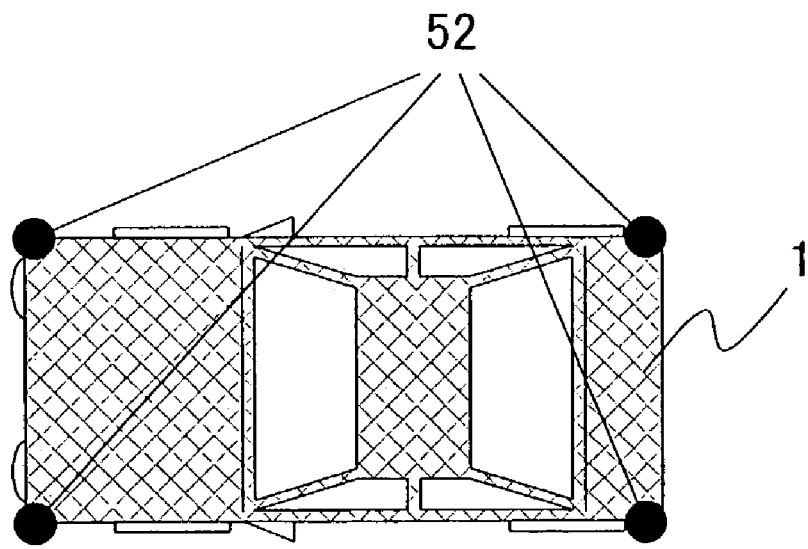
Figure 34A:
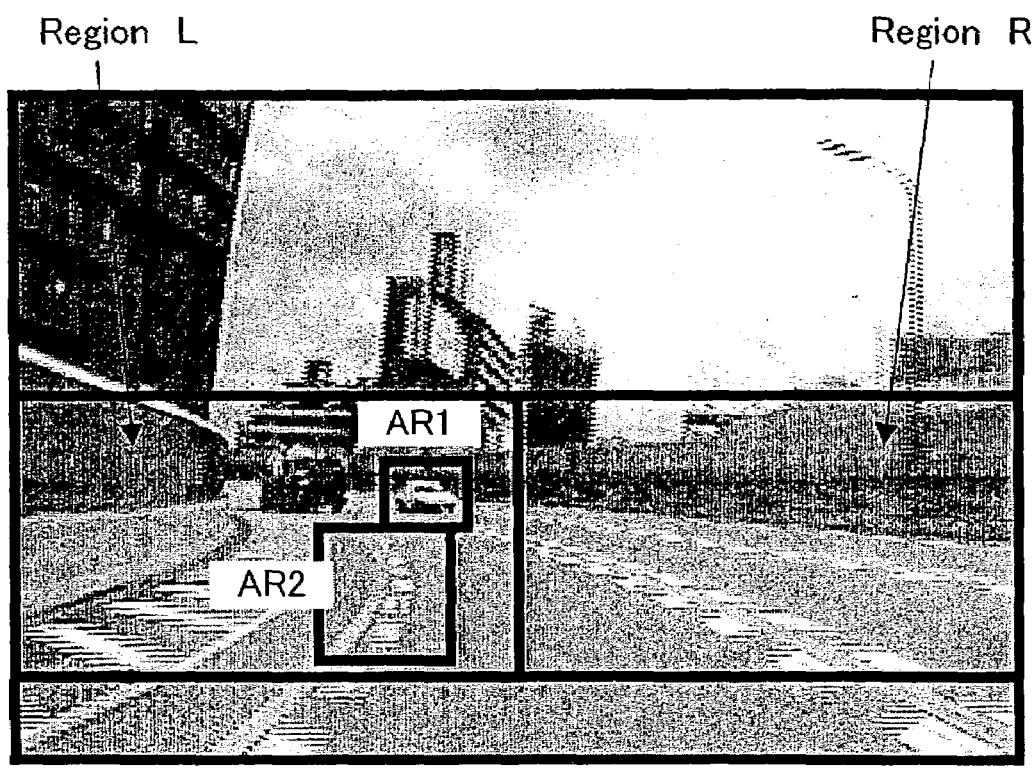
FIGS. 34A and 34B are views showing an example of a camera image of a scene in the rear from a vehicle, for demonstrating a problem of the first related art arising during curve running.
Figure 34B:
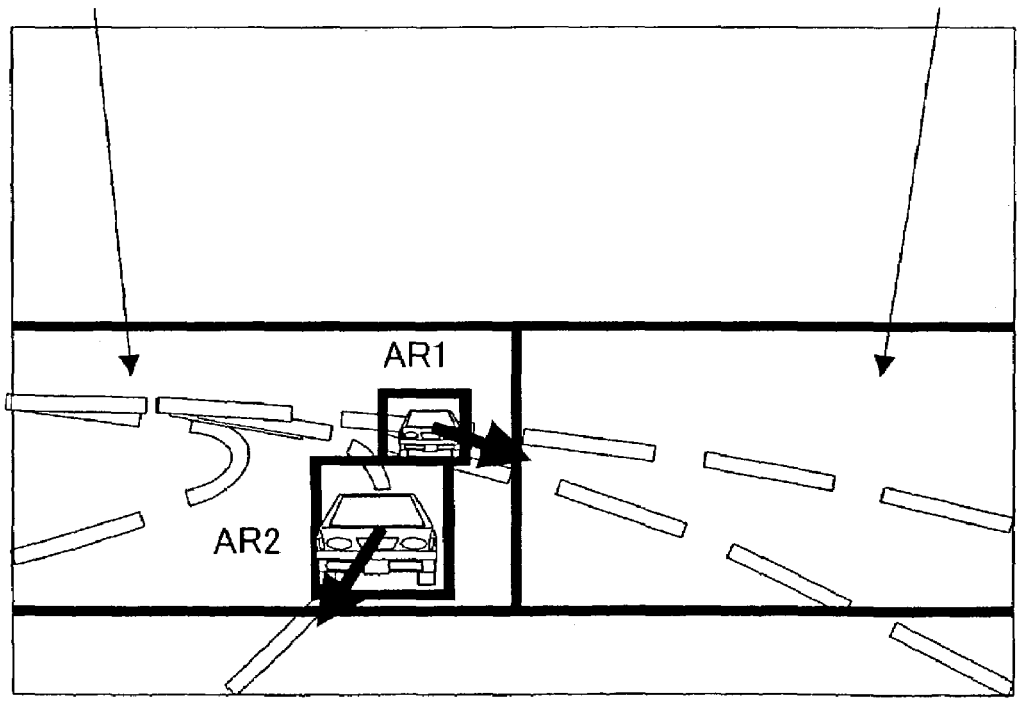
Figure 35:
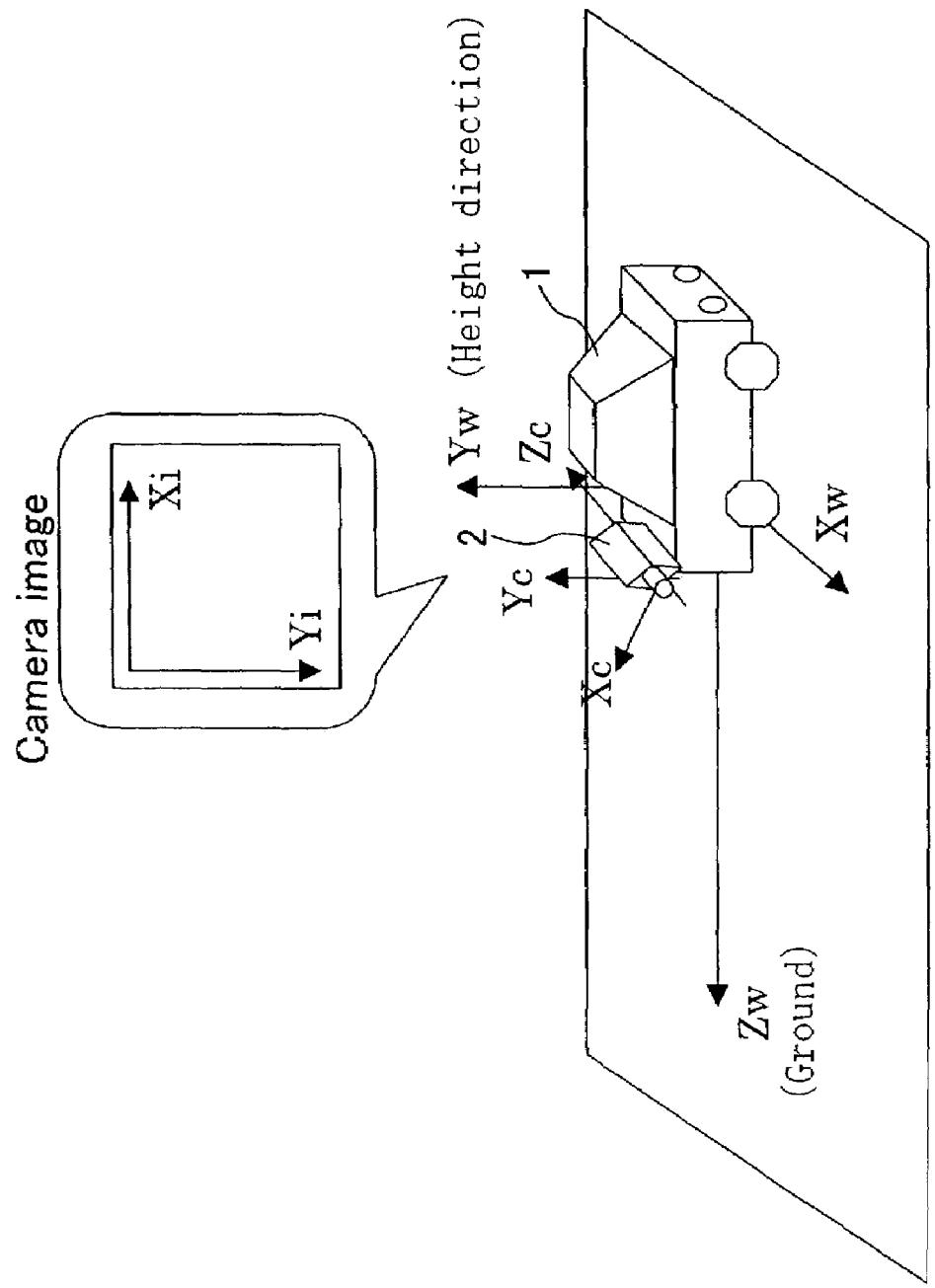
FIG. 35 is a view illustrating the relationship between a camera image and a three-dimensional coordinates in the real world.
Figure 36:
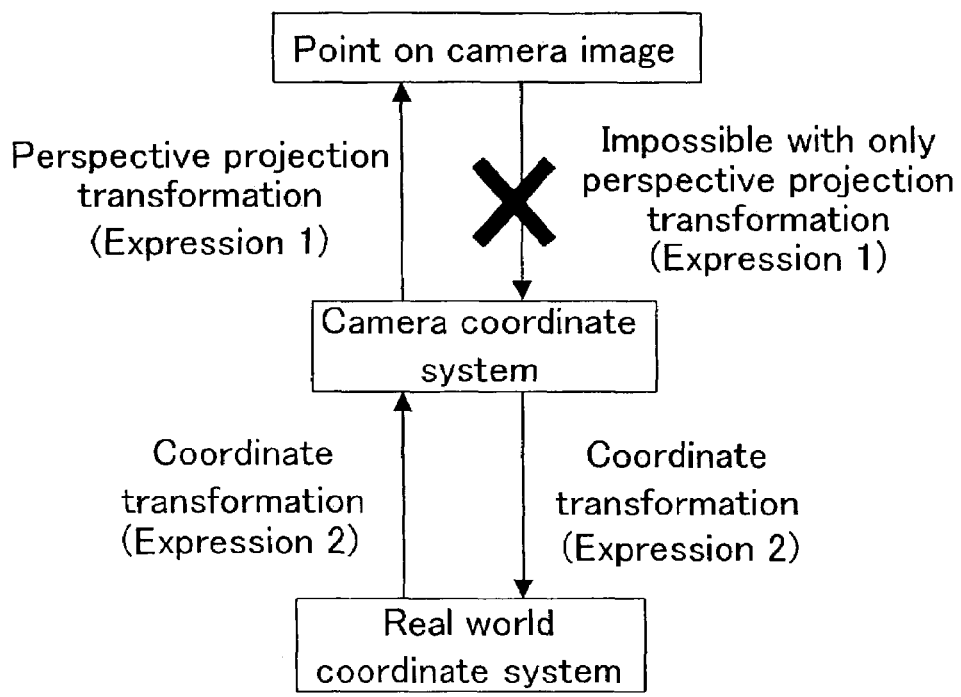
FIG. 36 is a view showing the relationship between a camera image and a real world coordinate system in the prior art.

FIGS. 33A and 33B are views showing examples of placement of obstacle sensors. In FIG. 33A, obstacle sensors 51 using laser, infrared, millimeter wave or the like are mounted on the bumper, the emblem and the like of a vehicle 1. In FIG. 33B, obstacle sensors 52 are placed on the four corners of the vehicle 1 at which an accident of contact with an obstacle is most likely to occur. The obstacle sensors 52 may be mounted on or under the bumpers or may be incorporated in the bumpers or the vehicle itself.

Obstacle sensors are greatly affected by the weather such as rain. Therefore, when rainfall is recognized from wiper operation information and the like, use of obstacle sensors may be stopped and switched to the method according to the present invention. This way of detection can improve the detection accuracy.

Alternatively, a region that has been detected as including an approaching object by the method of the present invention may be detected again with obstacle sensors. This way of detection can improve the detection accuracy for an approaching object and prevent generation of a false alarm.

Otherwise, only for a region determined including an obstacle as a result of detection with obstacle sensors, whether or not the obstacle is an approaching object may be determined by the method of the present invention. This way of detection can improve the processing speed.

All or part of the functions of the respective components of the monitoring device of the present invention may be implemented by a dedicated hardware device, or may be implemented by a software computer program.

As described above, the monitoring device for vehicles for detecting an approaching object using optical flows according to the present invention can maintain the detection accuracy even during curve running, and can detect an object running alongside the user's vehicle and a distant approaching object with small motion on a screen during straight-ahead running.

While the present invention has been described in preferred embodiments, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

What is claimed is:

1. A monitoring device comprising:
   first means for determining an optical flow from an image taken with a camera capturing the surroundings of a vehicle;
   second means for determining a background flow, which is an optical flow for the image under the assumption that the image is a background, based on motion of the vehicle and a space model modeling a space the camera is capturing, the space model identifying correspondence between points on the image and coordinates of a real world three-dimensional coordinate system; and
   third means for detecting motion of an object existing in the surroundings of the vehicle by comparing the optical flow with the background flow.

2. The monitoring device of claim 1, wherein the space model is prepared based on distance data of objects the camera is capturing.

3. The monitoring device of claim 2, wherein the vehicle is provided with an obstacle sensor, and the distance data is measured with the obstacle sensor.

4. The monitoring device of claim 1, wherein the space model at least includes a road surface model modeling a road surface on which the vehicle is running.

5. The monitoring device of claim 1, wherein the space model at least includes a wall model assuming a wall normal to a road surface on which the vehicle is running.

6. The monitoring device of claim 5, wherein the wall is assumed to exist in the rear from the vehicle on a side.

7. The monitoring device of claim 1, wherein the third means determines whether or not the magnitude of the optical flow is larger than a predetermined value, and
   if the magnitude is larger than the predetermined value, the comparison is made with use of an angle difference, or otherwise the comparison is made without use of an angle difference.

8. The monitoring device of claim 7, where in the predetermined value is set according to the magnitude of the background flow at a corresponding position on the image.

9. The monitoring device of claim 1, wherein the third means performs the steps of:
   specifying approaching object candidate flows among optical flows by comparing the optical flows with background flows;

generating an approaching object candidate region by associating neighboring ones of the approaching object candidate flows with each other; and determining the approaching object candidate flows related to the approaching object candidate region as noise when the area of the approaching object candidate region is smaller than a predetermined value.

10. The monitoring device of claim 1, wherein the second means determines as the background flow, a difference vector between camera coordinates at time t−1 and at time t of a point on the space model, the camera coordinate at time t of the point being determined based on the motion of the vehicle from time t−1 to time t.

11. A monitoring device comprising:

first means for determining an optical flow from an image taken with a camera capturing the surroundings of a vehicle, second means for determining a space flow, which is motion of a point on the image in a real world coordinate system, based on the optical flow, motion of the vehicle and a space model modeling a space the camera is capturing, the space model identifying correspondence between points on the image and coordinates of a real world three-dimensional coordinate system; and third means for detecting motion of an object existing in the surroundings of the vehicle based on the space flow.

12. A monitoring method comprising the steps of:

determining an optical flow from an image taken with a camera capturing the surroundings of a vehicle;

determining a background flow, which is an optical flow for the image under the assumption that the image is a background, based on motion of the vehicle and a space model modeling a space the camera is capturing, the space model identifying correspondence between points on the image and coordinates of a real world three-dimensional coordinate system; and detecting motion of an object existing in the surroundings of the vehicle by comparing the optical flow with the background flow.

13. The monitoring method of claim 12, further comprising the step of estimating motion of the vehicle using a vehicle speed sensor and a steering angle sensor provided for the vehicle.

14. The monitoring method of claim 12, wherein a difference vector between camera coordinates at time t−1 and at time t of a point on the space model is determined as the background flow, the camera coordinate at time t of the point being determined based on the motion of the vehicle from time t−1 to time t.

15. A computer program embedded on a computer readable medium for monitoring, allowing a computer to execute the steps of:

determining an optical flow from an image taken with a camera capturing the surroundings of a vehicle;

determining a background flow, which is an optical flow for the image under the assumption that the image is a background, based on motion of the vehicle and a space model modeling a space the camera is capturing, the space model identifying correspondence between points on the image and coordinates of a real world three-dimensional coordinate system; and detecting motion of an object existing in the surroundings of the vehicle by comparing the optical flow with the background flow.

16. The computer program of claim 15, wherein a difference vector between camera coordinates at time t−1 and at time t of a point on the space model is determined as the background flow, the camera coordinate at time t of the point being determined based on the motion of the vehicle from time t−1 to time t.

* * * * *